United States Patent
Abdoli et al.

(10) Patent No.: US 12,081,325 B2
(45) Date of Patent: Sep. 3, 2024

(54) METHODS AND APPARATUS FOR OVERLAID MODULATION

(71) Applicants: Javad Abdoli, Kanata (CA); Jianglei Ma, Ottawa (CA); Monirosharieh Vameghestahbanati, Kanata (CA)

(72) Inventors: Javad Abdoli, Kanata (CA); Jianglei Ma, Ottawa (CA); Monirosharieh Vameghestahbanati, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 892 days.

(21) Appl. No.: 16/936,478

(22) Filed: Jul. 23, 2020

(65) Prior Publication Data

US 2022/0029734 A1     Jan. 27, 2022

(51) Int. Cl.
*H04W 72/04* (2023.01)
*H04L 1/00* (2006.01)

(52) U.S. Cl.
CPC ........... *H04L 1/0003* (2013.01); *H04W 72/04* (2013.01)

(58) Field of Classification Search
CPC ... H04L 1/0003; H04L 1/0612; H04L 1/0016; H04L 1/0041; H04L 1/0045; H04L 1/08; H04L 5/0023; H04L 5/0044; H04L 5/0094; H04L 27/0008; H04L 27/26025; H04L 27/2602; H04W 72/04; H04B 7/0602
USPC .......................................................... 370/330
See application file for complete search history.

(56) References Cited

U.S. PATENT DOCUMENTS

| | | | |
|---|---|---|---|
| 8,031,105 B2 | 10/2011 | Stayton | |
| 2002/0119797 A1* | 8/2002 | Woodhead | H04B 17/318 455/3.01 |
| 2005/0152561 A1* | 7/2005 | Spencer | H04B 11/00 381/77 |
| 2007/0176660 A1* | 8/2007 | Andersen | H03K 7/08 327/175 |

(Continued)

FOREIGN PATENT DOCUMENTS

| | | |
|---|---|---|
| CN | 2705953 Y * | 4/2004 |
| CN | 106789821 A | 5/2017 |

(Continued)

OTHER PUBLICATIONS

R5-183000, Rohde and Schwarz, "Discussion on test point selection for transmit modulation quality test cases in FR1", 3GPP TSG RAN WG5 Meeting #79, Busan, Republic of Korea, May 21-25, 2018, total 5 pages.

*Primary Examiner* — Atique Ahmed

(57) ABSTRACT

In multi-domain modulation, also known as overlaid modulation, information is transmitted over more than one modulation domain. In such a transmission, different modulation domains are overlaid on top of each other. Signaling that is indicative of multiple modulation domains for overlaid modulation and is indicative of multiple modulation switching intervals is communicated in a wireless communication network, data modulated using the overlaid modulation is also communicated in the wireless communication network. The multiple modulation switching intervals include a respective modulation switching interval for each of the multiple modulation domains, and each respective modulation switching interval is different from other modulation switching intervals in the multiple modulation switching intervals.

17 Claims, 17 Drawing Sheets

(56) References Cited

U.S. PATENT DOCUMENTS

| | | | |
|---|---|---|---|
| 2009/0258610 A1 | 10/2009 | Kuo et al. | |
| 2010/0069028 A1* | 3/2010 | Choi | H04B 7/061 |
| | | | 455/136 |
| 2011/0151855 A1* | 6/2011 | Devison | H04W 52/362 |
| | | | 455/422.1 |
| 2011/0261901 A1* | 10/2011 | Murakami | H04B 7/0613 |
| | | | 375/295 |
| 2013/0287392 A1* | 10/2013 | Heimbuch | H04B 10/0799 |
| | | | 398/38 |
| 2021/0203236 A1* | 7/2021 | Zhang | H02M 3/33546 |

FOREIGN PATENT DOCUMENTS

| | | | | |
|---|---|---|---|---|
| CN | 108833325 A | | 11/2018 | |
| CN | 109845165 A | | 6/2019 | |
| EP | 3490206 B1 | * | 4/2021 | ............... H04J 4/00 |
| WO | 2004105337 A1 | | 12/2004 | |

* cited by examiner

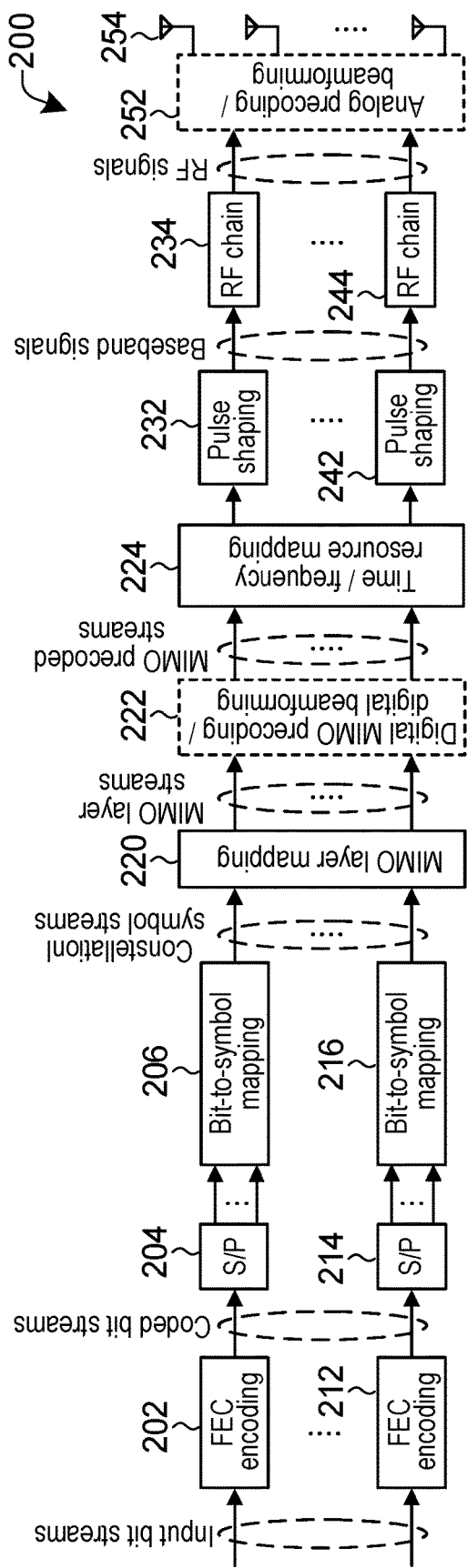
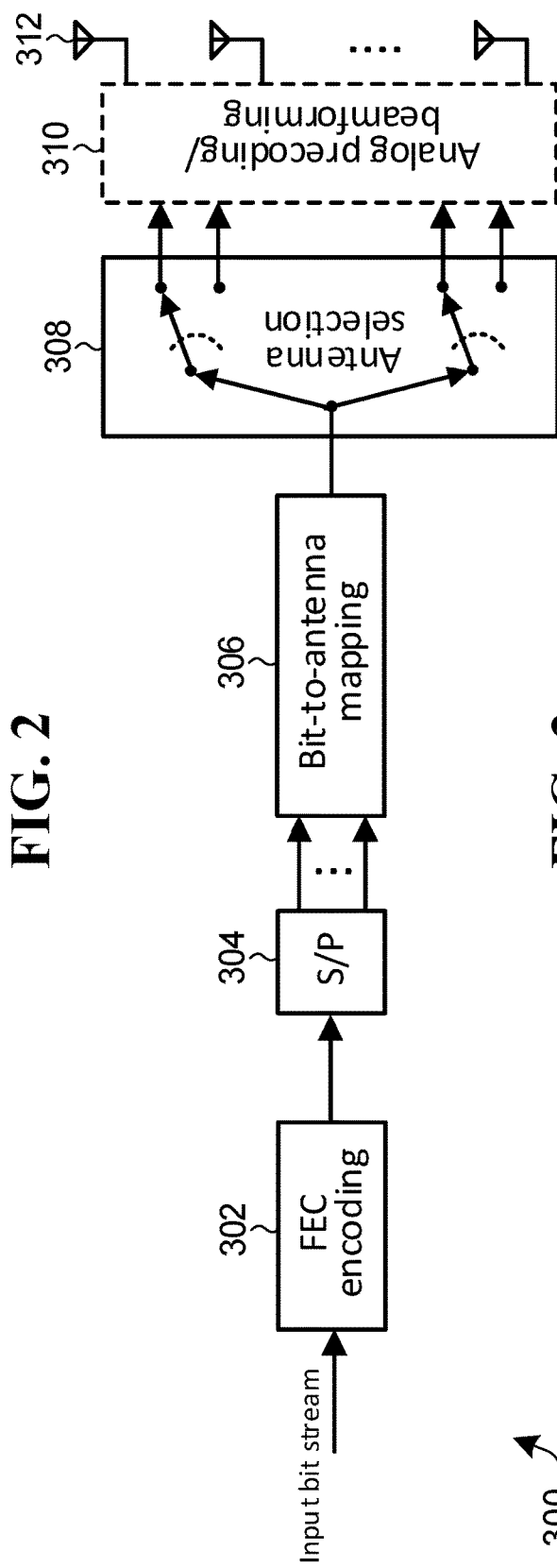
FIG. 2
FIG. 3

METHODS AND APPARATUS FOR OVERLAID MODULATION

FIELD

This application relates generally to communications, and in particular to communications that involve overlaid modulation.

BACKGROUND

Current wireless standards employ constellation-domain modulation, which is an example of single-domain modulation. In single-domain modulation, bits (typically Forward Error Correction (FEC) encoded bits) are mapped to modulation elements of a particular modulation domain. Each modulation element represents a particular combination of bits and is used to transmit the corresponding combination of bits over a communication channel. At a receiver side, the role of demodulation is to detect which modulation element was transmitted and declare the corresponding bits or Log-Likelihood Ratios (LLRs). Current wireless standards define constellation-domain modulation schemes and their related signaling and configurations.

In multi-domain modulation, also known as overlaid modulation, information is transmitted over more than one modulation domain. In such a transmission, different modulation domains are overlaid on top of each other. For example, a subset of bits is modulated over a constellation domain and the remaining bits are modulated over a spatial domain. A potential benefit of multi-domain modulation is an increase in spectral efficiency gained by utilizing available resources more efficiently. However, multi-domain modulation schemes generally involve more complexity than single-domain modulation schemes.

SUMMARY

In current wireless standards that use only constellation-domain modulation, related signaling and configurations are based on constellation-domain modulation. For example, current Downlink Control Information (DCI) in such standards does not support overlaid modulation scheduling. The present disclosure relates, in part, to new signaling that supports overlaid modulation.

Modulation switching granularity of a modulation domain can be defined as a subset of time/frequency resources over which the same bit combination and therefore the same modulation element is transmitted. Time/frequency resources as referenced herein may include time resources, frequency resources, or time-frequency resources. Modulation switching granularity is referred to herein primarily as modulation switching interval, but this concept may be referenced in other ways, as a switching period for example. Different modulation domains use the same modulation switching interval in conventional overlaid modulation. Using the same modulation switching interval for different modulation domains of an overlaid modulation may have several drawbacks for scheduling flexibility and potentially having to balance switching capabilities associated with the different modulation domains.

One aspect of the present disclosure relates to a method that involves communicating, in a wireless communication network, signaling indicative of multiple modulation domains for overlaid modulation and indicative of multiple modulation switching intervals. The multiple modulation switching intervals include a respective modulation switching interval for each of the multiple modulation domains. Each respective modulation switching interval is different from other modulation switching intervals in the multiple modulation switching intervals. A method may also involve communicating data, modulated using the overlaid modulation, in the wireless communication network.

According to another aspect of the present disclosure, an apparatus includes: a communication interface; a processor, coupled to the communication interface; and a non-transitory computer readable storage medium, coupled to the processor, storing programming for execution by the processor. The programming includes instructions to: communicate, in a wireless communication network, signaling indicative of multiple modulation domains for overlaid modulation and indicative of multiple modulation switching intervals; and communicate data, modulated using the overlaid modulation, in the wireless communication network. The multiple modulation switching intervals include a respective modulation switching interval for each of the multiple modulation domains, and each respective modulation switching interval is different from other modulation switching intervals in the multiple modulation switching intervals.

A computer program product according to yet another aspect of the present disclosure includes a non-transitory computer readable storage medium storing programming. The programming includes instructions to communicate, in a wireless communication network, signaling indicative of multiple modulation domains for overlaid modulation and indicative of multiple modulation switching intervals. The multiple modulation switching intervals include a respective modulation switching interval for each of the multiple modulation domains, and each respective modulation switching interval is different from other modulation switching intervals in the multiple modulation switching intervals. The programming also includes instructions to communicate data, modulated using the overlaid modulation, in the wireless communication network.

Other aspects and features of embodiments of the present disclosure will become apparent to those ordinarily skilled in the art upon review of the following description.

BRIEF DESCRIPTION OF THE DRAWINGS

For a more complete understanding of the present embodiments, and the advantages thereof, reference is now made, by way of example, to the following descriptions taken in conjunction with the accompanying drawings, in which:

FIG. 2 is a block diagram illustrating an example of a transmitter using constellation-domain modulation;

FIG. 3 is a block diagram illustrating an example of a transmitter using spatial modulation;

DETAILED DESCRIPTION

Figure 1:
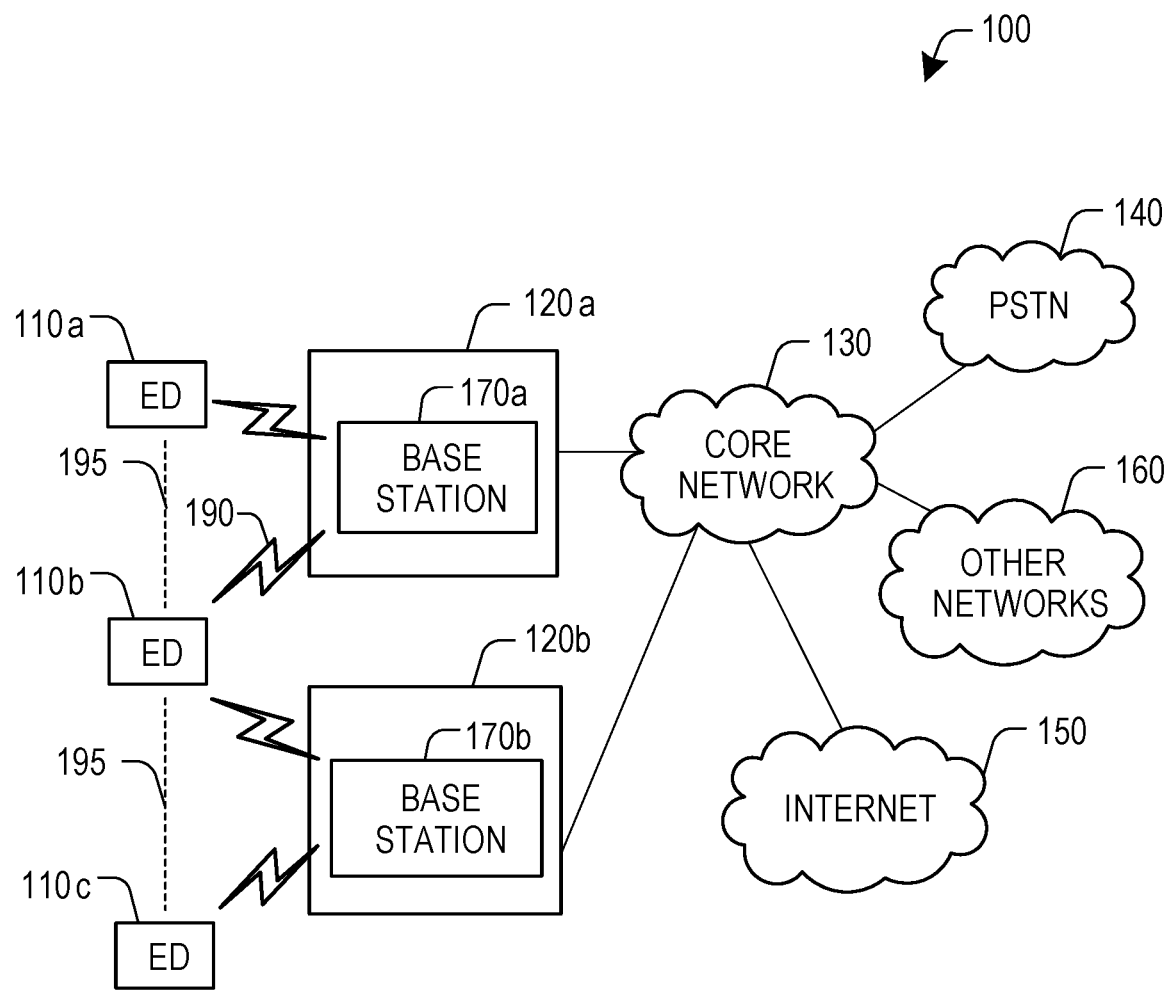
FIG. 1 illustrates an example communication system in which aspects of the present disclosure are implemented in some embodiments.

With reference first to FIG. 1, an example communication system 100 in which aspects of the present disclosure are implemented in some embodiments is shown. In general, the system 100 enables multiple wireless or wired elements to communicate data and/or other content. The purpose of the system 100 may be to provide content (e.g., any one or more of voice, data, video, text, referred to collectively herein as "data") via broadcast, unicast, multicast, user device to user device, etc. The system 100 may operate efficiently by sharing communication resources such as bandwidth.

In this example, the communication system 100 includes electronic devices (EDs) 110a-110c, Radio Access Networks (RANs) 120a-120b, a core network 130, a Public Switched Telephone Network (PSTN) 140, the Internet 150, and other networks 160. While certain numbers of these components or elements are shown in FIG. 1, any reasonable number of these components or elements may be included in the system 100.

The EDs 110a-110c are configured to operate, communicate, or both, in the system 100. For example, the EDs 110a-110c are configured to transmit, receive, or both via wireless communication channels. Each ED 110a-110c represents any suitable end user device for wireless operation and may include such devices as, or may be referred to as, a User Equipment (UE), Wireless Transmit/Receive Unit (WTRU), mobile station, mobile subscriber unit, cellular telephone, station (STA), Machine Type Communication device (MTC), Personal Digital Assistant (PDA), smartphone, laptop, computer, touchpad, wireless sensor, or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the Internet 150, and/or the other networks 160. For example, the base stations 170a-170b may be or include one or more of several well-known devices, such as a Base Transceiver Station (BTS), a Node-B (NodeB), an evolved NodeB (eNodeB), a Home eNodeB, a gNB (next generation NodeB), a Transmission Point (TP), a Transmission Reception Point (TRP), a site controller, an Access Point (AP), or a wireless router. Any ED 110a-110c may be alternatively or jointly configured to interface, access, or communicate with any other base station 170a-170b, the internet 150, the core network 130, the PSTN 140, the other networks 160, or any combination of the preceding. Optionally, the system may include RANs, such as RAN 120b, wherein the corresponding base station 170b accesses the core network 130 via the internet 150, as shown.

The EDs 110a-110c and base stations 170a-170b are examples of communication equipment that can be configured to implement some or all of the functionality or embodiments described herein. In the embodiment shown in FIG. 1, the base station 170a forms part of the RAN 120a, which may include other base stations, Base Station Controller(s) (BSC), Radio Network Controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b may be configured to operate to transmit and/or receive wireless signals within a particular geographic region or area, sometimes referred to as a coverage area. A cell may be further divided into cell sectors, and a base station 170a-170b may, for example, employ multiple transceivers to provide service to multiple sectors. In some embodiments a base station 170a-170b may be implemented as pico or femto nodes where the radio access technology supports such. In some embodiments, MIMO technology may be employed having multiple transceivers for each coverage area. The number of RANs 120a-120b shown is exemplary only. Any number of RANs may be contemplated when devising the system 100.

The base stations 170a-170b communicate with one or more of the EDs 110a-110c over one or more air interfaces 190 using wireless communication links e.g. RF, pWave, IR, etc. The air interfaces 190 may utilize any suitable radio access technology. For example, the system 100 may implement one or more channel access methods, such as Code Division Multiple Access (CDMA), Time Division Multiple Access (TDMA), Frequency Division Multiple Access (FDMA), Orthogonal FDMA (OFDMA), or Single-Carrier FDMA (SC-FDMA) in the air interfaces 190.

A base station 170a-170b may implement Universal Mobile Telecommunication System (UMTS) Terrestrial Radio Access (UTRA) to establish an air interface 190 using Wideband CDMA (WCDMA). In doing so, the base station 170a-170b may implement protocols such as HSPA, HSPA+ optionally including HSDPA, HSUPA or both. Alternatively, a base station 170a-170b may establish an air interface 190 with Evolved UTMS Terrestrial Radio Access (E-UTRA) using LTE, LTE-A, and/or LTE-B. It is contemplated that the system 100 may use multiple channel access functionality, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. Understandably, the RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the Internet 150, and the other networks 160). In addition, some or all of the EDs 110a-110c may include functionality for communicating with different wireless networks over different wireless links using different wireless technologies and/or protocols. PSTN 140 may include circuit switched telephone networks for providing Plain Old Telephone Service (POTS). Internet 150 may include a network of computers and subnets (intranets) or both, and incorporate protocols, such as IP, TCP, UDP. EDs 110a-110c may be multimode devices capable of operation according to multiple radio access technologies, and incorporate multiple transceivers necessary to support such technologies.

It is contemplated that the communication system 100 as illustrated in FIG. 1 may support an NR cell, which also may be referred to as a hyper cell. Each NR cell includes one or more base stations. The base stations of the NR cell may use the same NR cell ID. The NR cell ID is a logical assignment to all physical base stations of the NR cell and may be carried in a broadcast synchronization signal. The NR cell may be dynamically configured. The boundary of the NR cell may be flexible and the system dynamically adds or removes base stations to from the NR cell.

In one embodiment, an NR cell may have one or more base stations within the NR cell transmitting a UE-specific data channel, which serves a UE. The one or more base stations associated with the UE specific data channel are also UE specific and are transparent to the UE. Multiple parallel data channels within a single NR cell may be supported, with each data channel serving a different UE for example.

Direct communications between UEs such as the EDs 110a-110c in FIG. 1 are also possible, and direct communication links 195 between UEs are represented by dashed lines in FIG. 1. UEs may communicate directly with each other over sidelinks, for example.

Additional details regarding the EDs 110 and the base stations 170 are known to those of skill in the art. As such, these details are omitted here for clarity.

Embodiments disclosed herein may be applied to downlink communications, uplink communications, or both. Embodiments may also or instead be applied to direct device to device communications such as sidelink communications.

Communications consistent with the present disclosure involve overlaid modulation. Overlaid modulation combines multiple modulation domains to modulate subsets of data bits.

Before discussing overlaid modulation in detail herein, single-domain modulation is considered. Constellation-domain modulation is one example of single-domain modulation, and in this example constellation symbols are modulation elements to which bits, which my have been FEC encoded, are mapped. A constellation symbol is a complex number or a vector of complex values representing a combination of bits, and is used to transmit the represented combination of bits over a communication channel.

FIG. 2 is a block diagram illustrating an example of a transmitter using constellation-domain modulation. As shown, the example transmitter 200 in FIG. 2 includes various modules or elements, including FEC encoding modules 202, 212 to FEC encode input bit streams, serial-to-parallel conversion modules 204, 214 to convert serial coded bit streams to parallel, bit-to-symbol mapping modules 206, 216 to map bits to symbols, a Multiple-Input Multiple-Output (MIMO) layer mapping module 220 to map constellation symbol streams to MIMO layers, a digital MIMO precoding/digital beamforming module 222 to apply digital precoding and beamforming to MIMO layer streams, a time/frequency resource mapping module 224 to map MIMO precoded streams to time/frequency resources, pulse shaping modules 232, 242 to apply pulse shaping to resource-mapped signals and generate baseband signals, Radio Frequency (RF) chains 234, 244, and an analog precoding/beamforming module 252 to apply analog precoding and beamforming to RF signals for transmission via antenna elements 254. In particular, the bit-to-symbol mapping modules 206, 216 relate to the constellation-domain modulation in this example.

Another example of single-domain modulation is spatial-domain modulation or spatial modulation (SM), in which modulation elements are subsets of antenna elements, and each bit combination is mapped to a corresponding subset of antenna elements. In other words, a subset of antenna elements is used for transmission of a corresponding bit combination, with other antenna elements being turned off.

FIG. 3 is a block diagram illustrating an example of a transmitter using spatial modulation. As shown, the example transmitter 300 in FIG. 3 includes various modules or elements, including a FEC encoding module 302 to FEC encode an input bit stream, a serial-to-parallel conversion module 304 to convert a serial coded bit stream to parallel, a bit-to-antenna mapping module 306 to map bit combinations to antenna elements, an antenna selection module 308 to select antenna elements based on the mapping by the bit-to-antenna mapping module 306, and an analog precoding/beamforming module 310 to apply analog precoding and beamforming to input signals received from the antenna selection module 308 for transmission via selected ones of the antenna elements 312.

Yet another example of single-domain modulation is MBM, wherein so-called parasitic elements or RF mirrors are selectively used to transmit information. The modulation elements in MBM are, therefore, subsets of the RF mirrors that are turned on for transmission of a corresponding combination of bits while other RF mirrors are turned off.

Figure 4:
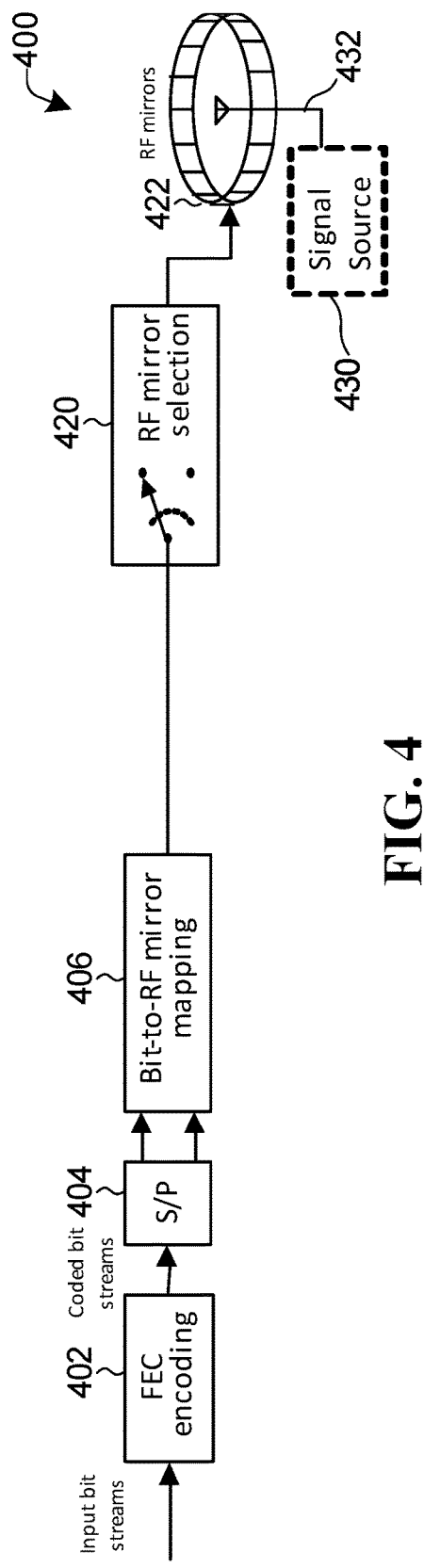
FIG. 4 is a block diagram illustrating an example of a transmitter using Media-Based Modulation (MBM)

FIG. 4 is a block diagram illustrating an example of a transmitter using MBM. As shown, the example transmitter 400 in FIG. 4 includes various modules or elements, including a FEC encoding module 402 to FEC encode input bit streams, a serial-to-parallel conversion module 404 to convert serial coded bit streams to parallel, a bit-to-RF mirror mapping module 406 to map bit combinations to a subsets of RF mirrors, an RF mirror selection module 420 to select RF mirrors based on the mapping by the bit-to-RF mirror mapping module 406, the RF mirrors 422, a signal source 430 to generate a signal, and an antenna element 432 to radiate the signal from the signal source. Selected RF mirrors 422 are turned on (or off) to reflect (or pass) signals radiated from the antenna element 432.

In multi-domain modulation, information is be transmitted over more than one modulation domain. In such a transmission, different modulation domains are overlaid on top of each other. A potential benefit of overlaid modulation is an increase in spectral efficiency by utilizing available resources more efficiently. An example of overlaid modulation is generalized spatial modulation, wherein a subset of bits, which may be FEC encoded bits, are modulated over a constellation domain and other bits are modulated over a spatial domain.

Figure 5:
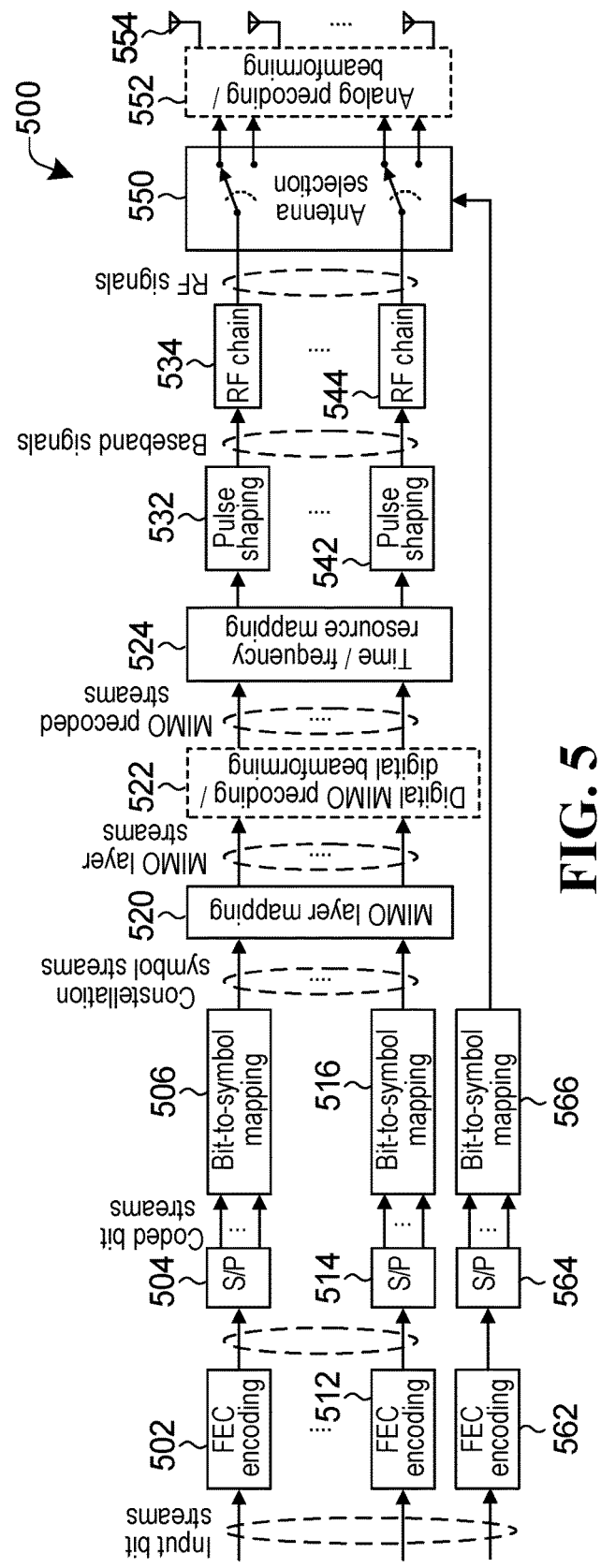
FIG. 5 is a block diagram illustrating an example of a transmitter using generalized spatial modulation.

FIG. 5 is a block diagram illustrating an example of a transmitter using generalized SM. As shown, the example transmitter 500 in FIG. 5 includes various modules or elements. The modules 502/512, 504/514 and 506/516 relate to constellation-domain modulation as also illustrated in FIG. 2, and the modules 562, 564, 566, 550, 552, and 554 relate to SM as also illustrated in FIG. 3. The other modules 520, 522, 524, 532/542, and 534/544 in FIG. 5 are the same as or substantially similar to similarly-labelled modules in FIG. 2.

Current wireless standards that use only constellation-domain modulation and related signaling and configurations based on constellation-domain modulation do not support overlaid modulation scheduling. Although conventional multi-domain modulation or overlaid modulation use different modulation domains, the same modulation switching interval is used for the different modulation domains. Such use of the same modulation switching interval for different modulation domains of an overlaid modulation may unnecessarily restrict scheduling flexibility.

Another potential drawback of using the same modulation switching interval for different modulation domains of an overlaid modulation is that a transmitter may not be able to switch modulation elements of one modulation domain as fast as another modulation domain. For example, in generalized spatial modulation with spatial modulation and constellation-domain modulation, a transmitter may not be able to switch antenna elements in the spatial modulation on per-Orthogonal Frequency Division Multiplexing (OFDM)-symbol basis or Resource Element (RE)-level and also the number of different spatial domain symbols may be limited to the number of available RF chains, whereas constellation symbols can be switched in the constellation-domain modulation on a per-OFDM symbol or per-subcarrier or per-RE basis. This is due to the fact that spatial-domain switching is done in the RF domain using specific RF chain hardware/software, whereas constellation-domain switching is done in baseband using digital circuitry. Thus, using a symbol-level or RE-level switching interval as in conventional SM and MBM may not be feasible depending on how fast a UE or other device can switch antenna elements or parasitic elements, for example.

The present disclosure provides signaling mechanisms and configurations to enable overlaid modulation with potentially different modulation intervals in different modulation domains.

Regarding signaling for overlaid modulation, some embodiments disclosed herein relate to signaling to enable communication of multiple data streams using multiple modulation domains (overlaid modulation) with multiple modulation switching intervals. For example, embodiments may provide signaling to specify overlaid modulation parameters including modulation switching intervals, and/or control signaling for scheduling transmission. Examples of modulation domains include signal domain (including but not limited to constellation domain), antenna/parasitic element domain or other types of spatial domain, beam/precoder domain, etc.

One or more current standards may be modified, or one or more new standards may be developed, to support new modulation domains, to specify modulation switching intervals and/or Modulation and Coding Scheme (MCS) tables, or to provide signaling details such as DCI commands or bitfields to signal overlaid modulation or separate signaling for overlaid modulation. Higher-layer signaling may also or instead be provided to configure or at least partly configure modulation details.

The present disclosure also encompasses embodiments of multi-traffic transmission using overlaid modulation. For example, different bits or traffic may be transmitted, using different modulation domains, with different parameters or characteristics such as different Quality of Service (QoS), delay, or reliability targets or requirements. Related signaling may involve, for example, new signaling such as new DCI formats for particular traffic or joint traffic scheduling in a DCI.

Regarding overlaid modulation with multiple modulation switching intervals, in accordance with an aspect of the present disclosure overlaid multi-domain modulation is multi-domain modulation that involves modulating one bit stream or multiple bit streams over multiple modulation domains, with multiple modulation switching intervals. A modulation domain may generally be considered a domain that is used to modulate or otherwise convert bits for transmission in a wireless communication network.

Figure 6:
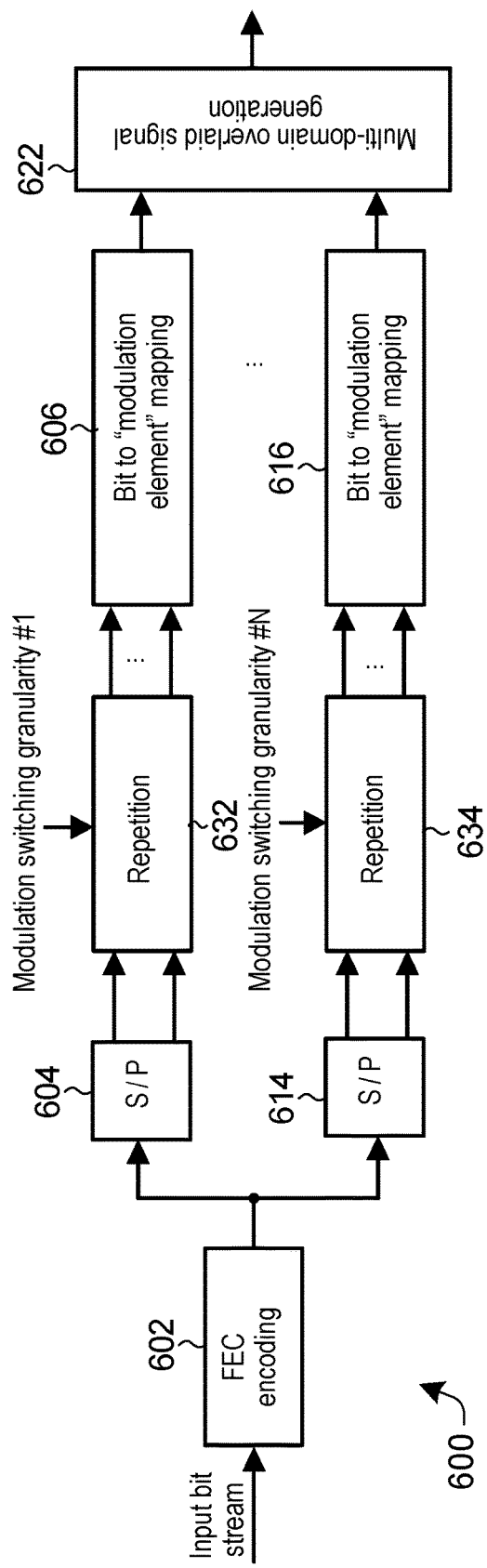
FIG. 6 is a block diagram illustrating an example of a transmitter implementing overlaid modulation with a single input bit stream.

Overlaid modulation can be applied to a single data stream or to multiple data streams. FIG. 6 is a block diagram illustrating an example of a transmitter implementing overlaid modulation with a single input bit stream. The example transmitter 600 includes several modules or elements, example implementations of which are provided elsewhere herein, and in general other embodiments may include more, fewer, or different modules or elements.

For example, the input bit stream in FIG. 6 is received by a FEC encoding module 602 to encode the input bits, but FEC encoding is optional. Serial-to-parallel conversion modules 604, 614 to receive the (FEC encoded) bit stream and convert the bit stream to parallel are also optional, in that data to be modulated may already be in parallel or may be processed serially. The bit to modulation element mapping modules 606, 616 receive input bit combinations and map those combinations to modulation elements, examples of which are provided elsewhere herein. The multi-domain overlaid signal generation module 622 represents modulation overlay, but as will become apparent from examples provided elsewhere herein, overlaying of modulation domains need not necessarily involve a module that is separate from modulation or mapping modules 606, 616. Similarly, the repetition modules 632, 634 are intended to represent the concept of respective modulation switching intervals at which modulation elements associated with each modulation domain may be switched, but this concept need not necessarily involve modules that are separate from the modulation or mapping modules 606, 616.

In FIG. 6, a single input bit stream is duplicated, split, or otherwise distributed for modulation according to two different modulation domains. In other words, in a single-stream overlaid modulation, a single stream of information bits is optionally FEC encoded as in the example shown, and then multiplexed over different modulation domains.

Figure 7:
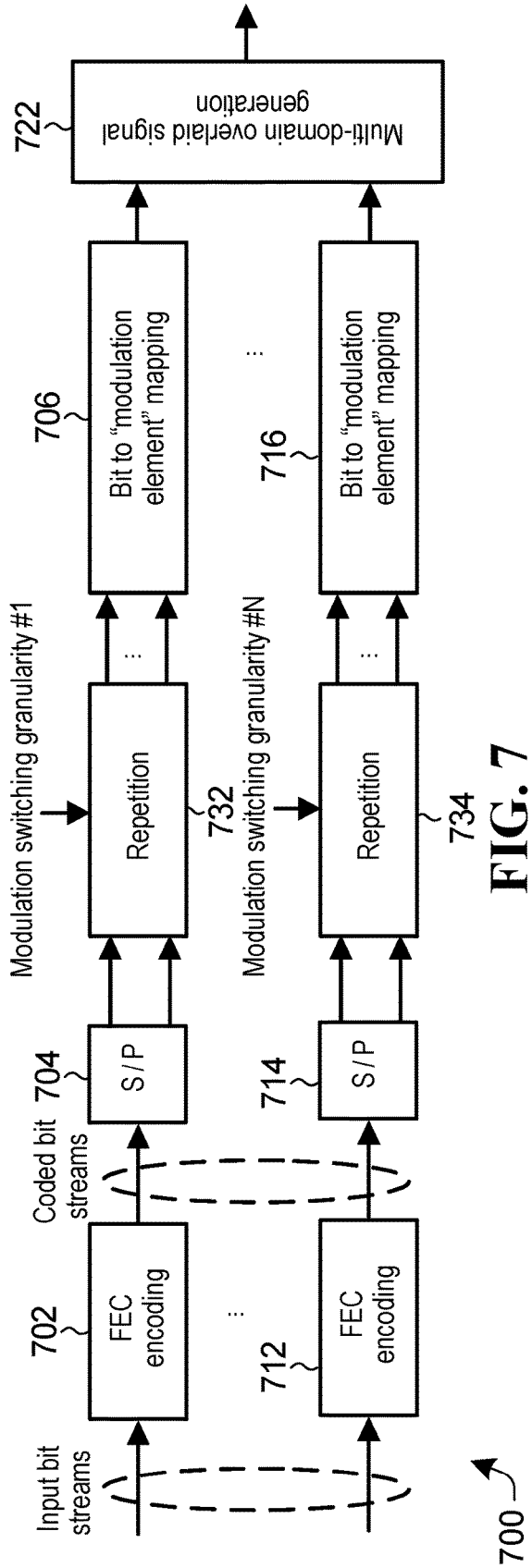
FIG. 7 is a block diagram illustrating an example of a transmitter implementing overlaid modulation with multiple input bit streams.

FIG. 7 is a block diagram illustrating an example of a transmitter 700 implementing overlaid modulation with multiple input bit streams. In a multi-stream overlaid modulation, each data stream is optionally FEC encoded separately, and separately mapped to a corresponding modulation domain.

The example transmitter 700 is substantially similar to the example transmitter 600 in FIG. 6 in that it includes optional serial-to-parallel conversion modules 704, 714 to receive optionally FEC encoded bit streams and convert the bit stream to parallel, bit to modulation element mapping modules 706, 716, a multi-domain overlaid signal generation module 722, and repetition modules 732, 734. In FIG. 7, however, multiple optional FEC encoding modules 702, 712 are provided to encode the separate input bit streams.

Overlaid modulation is applied to a single input bit stream in FIG. 6 and to separate bit streams in FIG. 7. In general, the input bit subsets or blocks for which different modulation domains are used may have no overlap, some overlap, or full overlap. In FIG. 7, for example, there is no overlap between the separate input bit streams, which are modulated using respective different modulation domains. Although the bit combinations distributed to the different modulation domains in FIG. 6 may similarly have no overlap, in some embodiments one or more of the same bits may be distributed for modulation using multiple modulation domains (partial overlap), or a bit stream may be fully duplicated and distributed to multiple modulation domains (full overlap).

Embodiments such as those illustrated by way of example in FIGS. 6 and 7 may provide better flexibility of scheduling and resource allocation as compared to using the same modulation switching interval for all modulation domains. Another potential advantage is to enable overlaid modulation for transmitters with different capabilities, such as different modulation switching capabilities for different modulation domains.

The modulation switching interval of a modulation domain is a subset of time/frequency resources over which the same bit combination, and accordingly the same modulation element, is transmitted. Modulation switching interval may be considered a number of modulation switching units in some embodiments.

Figure 8:
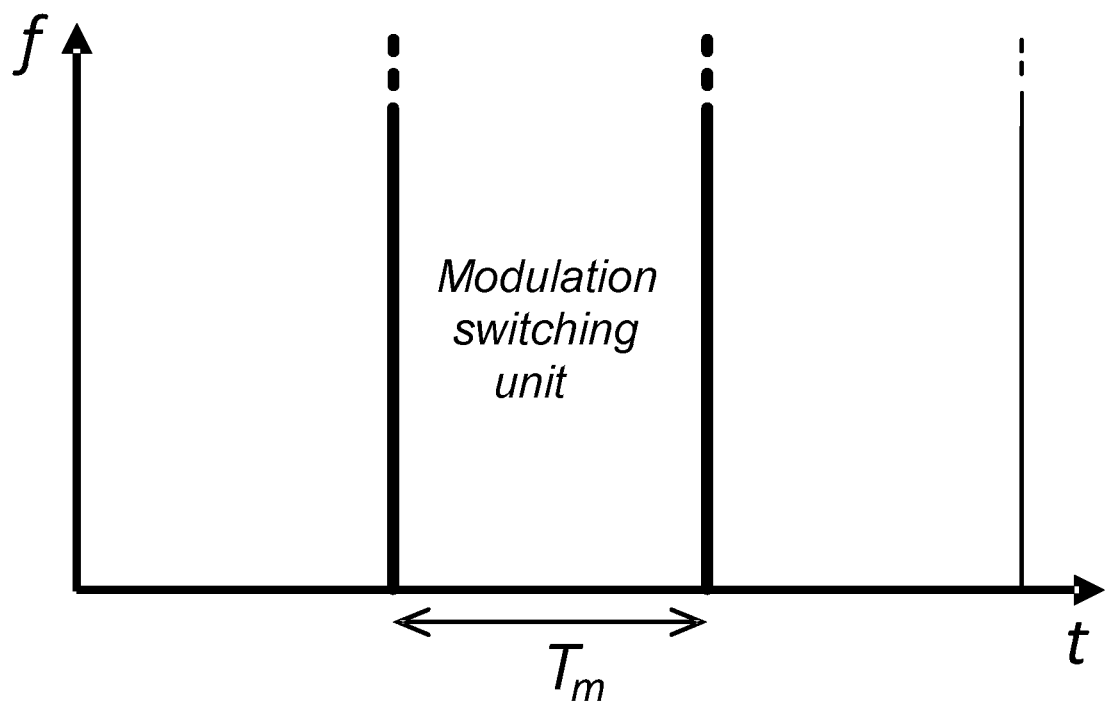
FIG. 8 is a time-frequency plot illustrating a modulation switching time unit for time switching.
Figure 9:
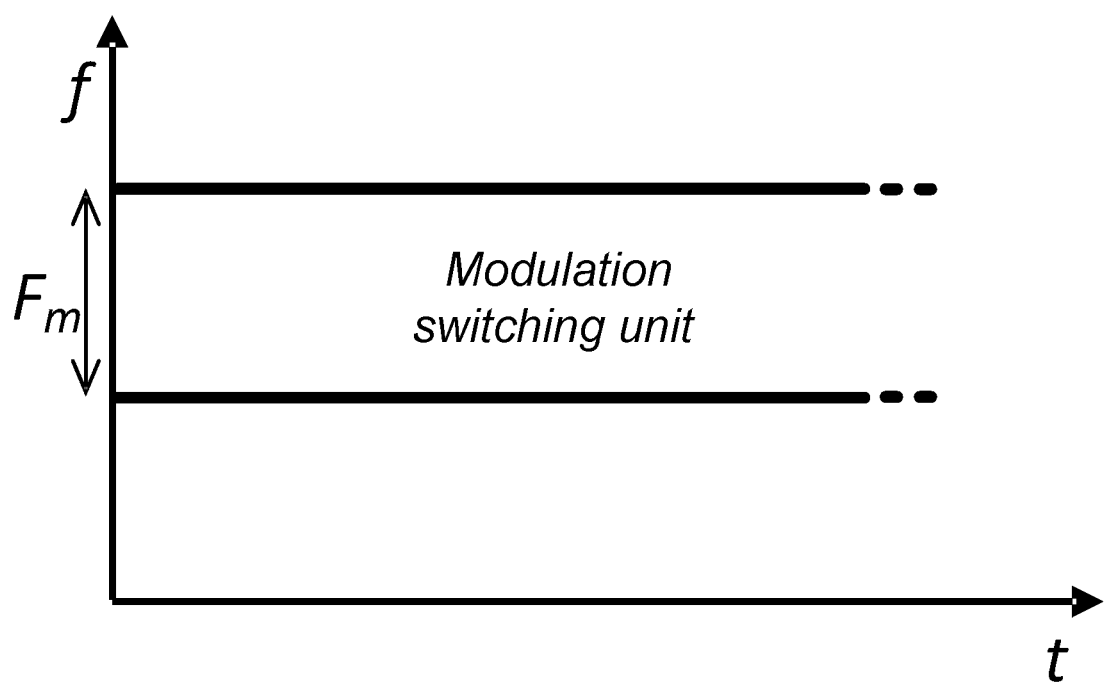
FIG. 9 is a time-frequency plot illustrating a modulation switching frequency unit for frequency switching.

Modulation switching units may be time units or frequency units, for example. Examples of a modulation switching time unit ($T_m$) include: one or more OFDM symbols; one or more slots; one or more subframes; a particular absolute time value; and a portion of time duration of data transmission such as 1/n of a number of scheduled symbols. Examples of a modulation switching frequency unit ($F_m$) include: one or more subcarriers; one or more Resource Blocks (RBs); one or more Physical Resource Groups (PRGs); a particular absolute frequency value; and a portion of bandwidth of data transmission, such as 1/n of a number of scheduled RBs. FIG. 8 is a time-frequency plot illustrating a modulation switching time unit ($T_m$) for time switching, and FIG. 9 is a time-frequency plot illustrating a modulation switching frequency unit ($F_m$) for frequency switching.

Figure 10:
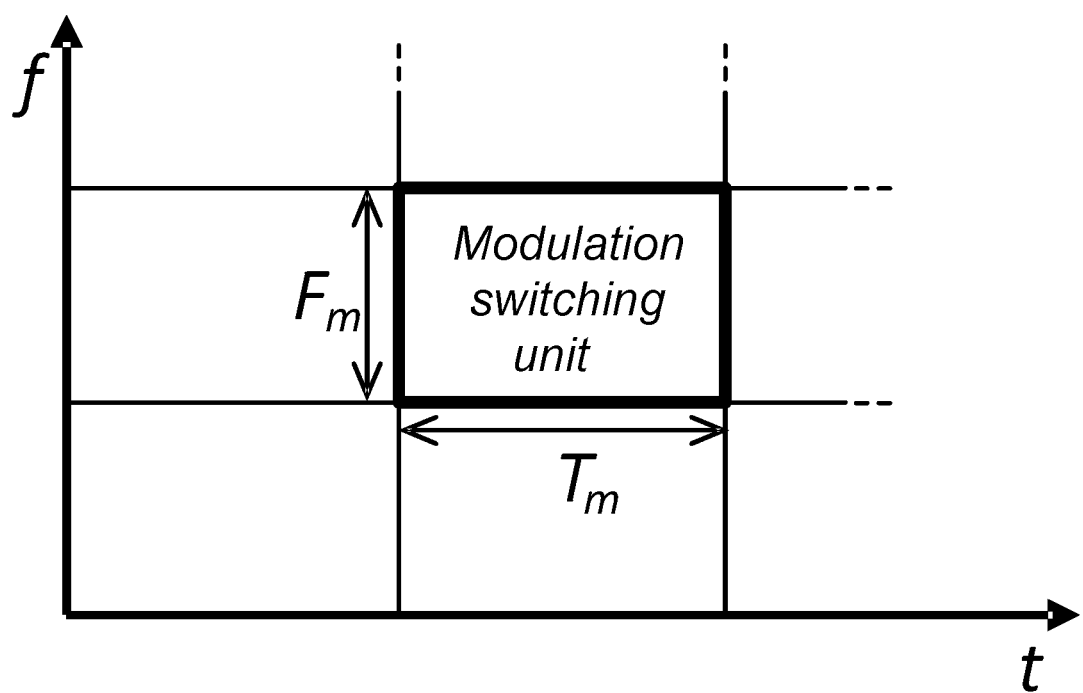
FIG. 10 is a time-frequency plot illustrating a modulation switching time-frequency unit for time-frequency switching.

FIG. 10 is another time-frequency plot illustrating a modulation switching time-frequency unit for time-frequency switching. As shown in FIG. 10, a modulation switching unit may be multi-dimensional, and involve switching based on both time and frequency in the illustrated example.

In general, embodiments may provide flexibility of time switching, frequency switching, or both, depending on modulation domain and/or the capability of a transmitter, for example.

A modulation switching interval may be interpreted in conjunction with a modulation switching grid, according to which modulation switching is performed. Two options can be considered, in different combinations, for determination of a modulation switching grid with respect to time-frequency location of a data transmission or resources that have been scheduled resources for the data transmission. These options are labelled as follows in FIGS. 11 to 14, which are time-frequency plots illustrating example modulation switching grids:

Option A: the modulation switching grid is independent of time-frequency location of data transmission;

Option B: the modulation switching grid is defined with respect to the time-frequency location of data transmission.

Figure 11:
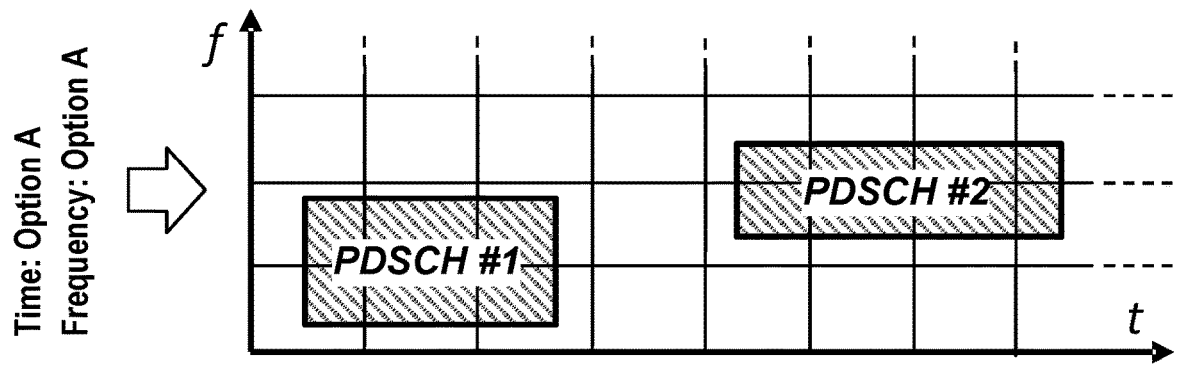
FIGS. 11 to 14 are time-frequency plots illustrating example modulation switching grids.

FIG. 11 illustrates an example modulation switching grid that is independent of both time and frequency of data transmission, and switching units do not align with the data transmissions. Although the data transmissions are shown as two transmissions, #1 and #2, in Physical Downlink Shared Channel (PDSCH), this is just one example of a channel in which data may be transmitted. In particular, the data transmissions can be downlink (DL), uplink (UL), or sidelink (SL) data transmissions or data transmission between any two nodes in a wireless network.

Figure 12:
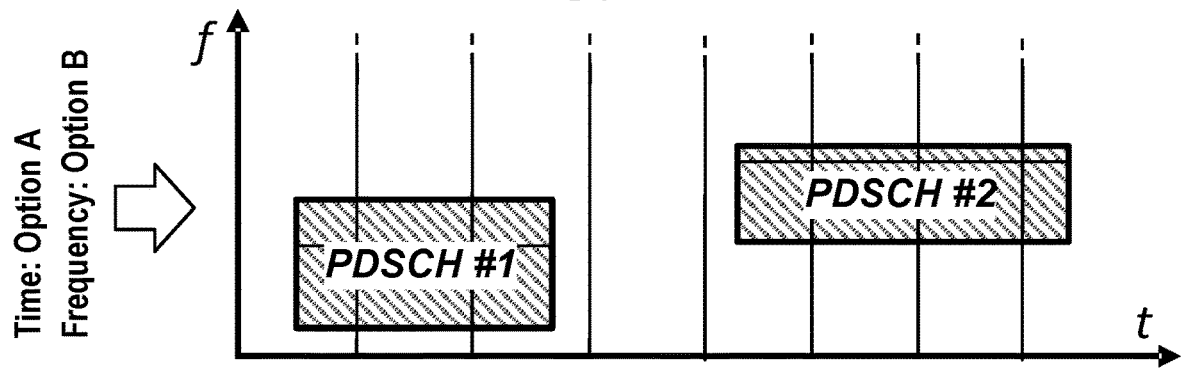

FIG. 12 illustrates an example modulation switching grid that is independent of time location of data transmission, but switching units are defined in frequency with respect to the starting frequency locations of data transmissions.

Figure 13:
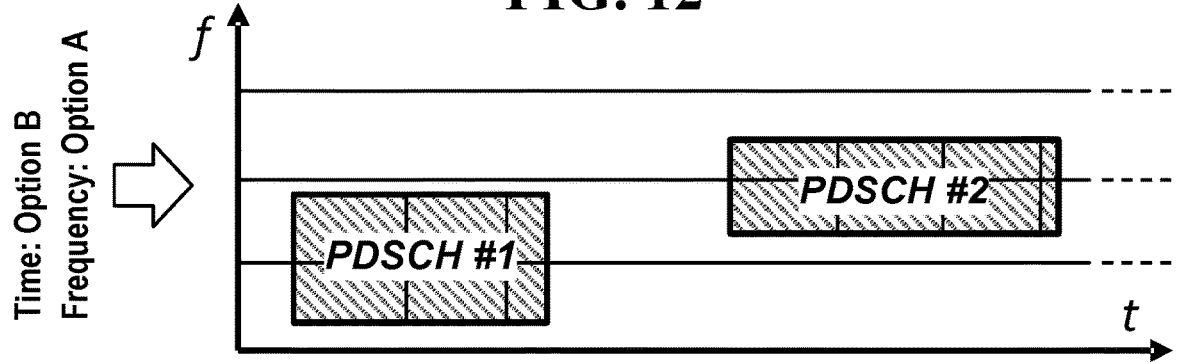

In FIG. 13, the example modulation switching grid is independent of frequency location of data transmissions, but switching units are defined in time with respect to the starting time locations of data transmissions.

Figure 14:
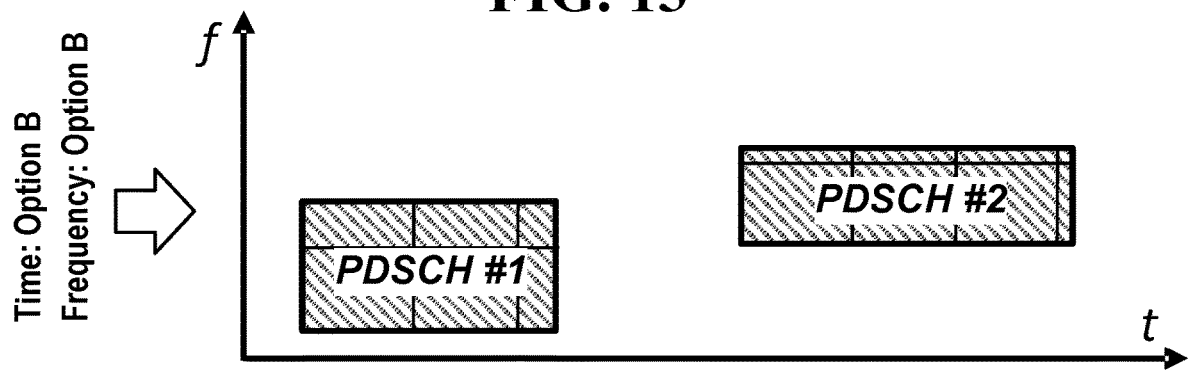

Time and frequency location alignment are illustrated in FIG. 14. Switching units are defined in both time and frequency with respect to the starting time-frequency locations of data transmissions.

A modulation switching grid that is independent of time-frequency location of data transmission may involve less complexity at a network side and possibly better resource management from the network side, because different UEs may use the same grid for modulation switching. A modulation switching grid that is defined with respect to the time-frequency location of data transmission may involve less complexity at a transmitter, because there may potentially be less "fractional" switching within a transmission. In FIG. 11, for example, each data transmission spans two partial switching frequency units and two partial switching time units, whereas there is only one partial switching frequency unit per data transmission in FIGS. 12 and 14 and only one partial switching time unit per data transmission in FIGS. 13 and 14.

Modulation switching patterns of different modulation domains can be aligned with each other, also referred to herein as aligned overlay, or unaligned with each other, also referred to herein as unaligned overlay.

Figure 15:
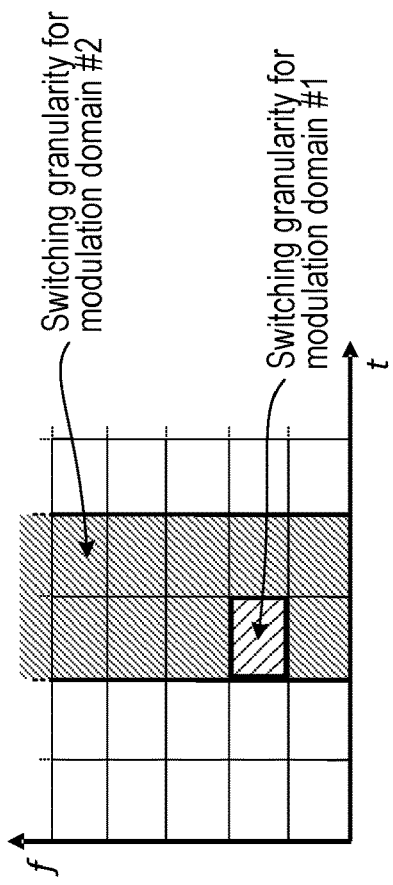
FIGS. 15 and 16 are time-frequency plots illustrating examples of aligned modulation switching patterns for different modulation domains.
Figure 16:
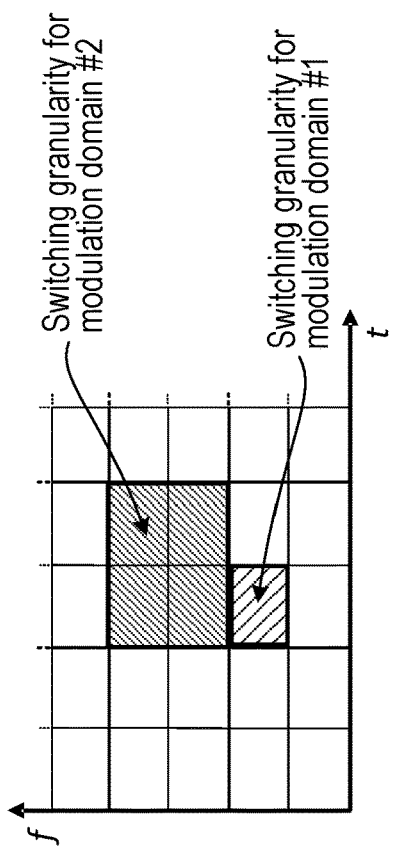

FIGS. 15 and 16 are time-frequency plots illustrating examples of aligned modulation switching patterns for different modulation domains. Two modulation domains #1 and #2 have different modulation switching intervals as shown, and each modulation switching interval corresponds to a modulation element of the associated modulation domain. In both of these examples, each modulation element of modulation domain #2 is overlaid on multiple modulation elements of modulation domain #1, whereas each modulation element of modulation domain #1 is overlaid on only one modulation element of modulation domain #2.

Figure 17:
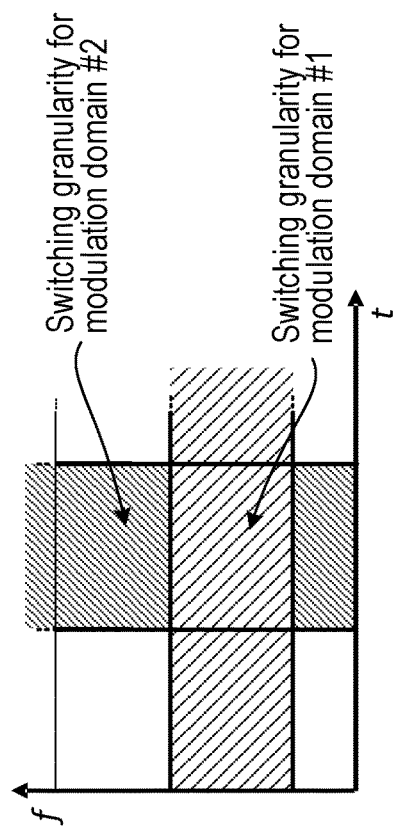
FIGS. 17 and 18 are time-frequency plots illustrating examples of unaligned modulation switching patterns for different modulation domains.
Figure 18:
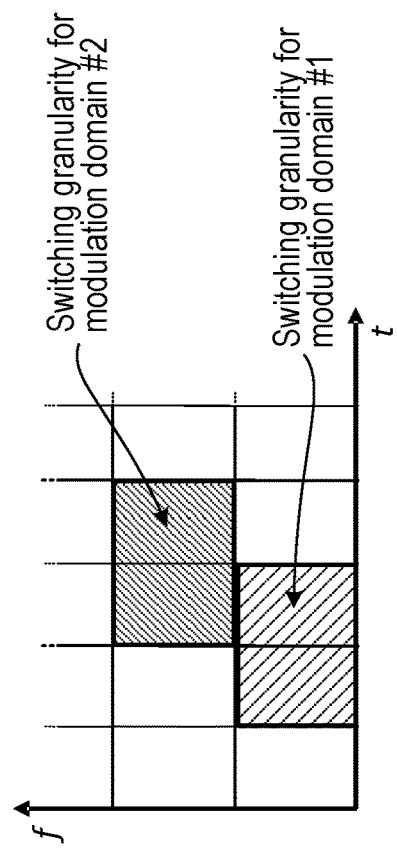

FIGS. 17 and 18 are time-frequency plots illustrating examples of unaligned modulation switching patterns for different modulation domains. As in FIGS. 15 and 16, two modulation domains #1 and #2 have different modulation switching intervals as shown, and each modulation switching interval corresponds to a modulation element of the associated modulation domain. In the examples shown in FIGS. 17 and 18, each modulation element of modulation domain #2 is overlaid on multiple modulation elements of modulation domain #1, and each modulation element of modulation domain #1 is overlaid on multiple modulation elements of modulation domain #2.

It should be noted that a combination of aligned overlay and unaligned overlay is also possible, wherein modulation switching patterns, modulation switching intervals, and modulation elements are aligned between some modulation domains and unaligned between other modulation domains.

Aligned overlay may involve less transmitter and receiver complexity compared to unaligned overlay, because in aligned overlay a more limited and predetermined number of modulation elements are always transmitted/received/decoded together. In this sense, modulation elements from different modulation domains may be more "localized". For example, comparing FIG. 15 to FIG. 17, it can be seen that one modulation element of modulation domain #1 fully overlaps four modulation elements of modulation domain #2 in FIG. 15, thereby potentially reducing receiver complexity, whereas there is only partial overlap between modulation elements of the different modulation domains in FIG. 17.

Unaligned overlay may provide better performance compared to aligned overlay, because each modulation element of a modulation domain is overlaid with multiple modulation elements of other domains, and therefore may provide higher diversity in decoding. Such partial overlap however, may also allow a higher level of error propagation relative to aligned overlay.

A modulation switching unit may be determined in any of various ways. For example, the value of modulation switching unit can be specified in a standard specification or otherwise predetermined, or configured by higher-layer signaling. Cell-specific and UE-specific higher-layer signaling are possible.

The value of a modulation switching unit can be the same for all modulation domains, different for one or more modulation domains, or specific to each modulation domain.

According to another aspect of the present disclosure, the value of a modulation switching unit can be numerology-specific. For example, a reference numerology may be specified in a standard specification or otherwise predetermined. Examples of a reference numerology include a fixed specified numerology or one of a number of configured numerologies of a communication system. Numerology of data transmission, for PDSCH or Physical Uplink Shared Channel (PUSCH) for example, may also or instead be a basis for determining the value of a modulation switching unit.

These examples illustrate details of how a modulation switching unit may be specified or determined. Embodiments may be applied in both single numerology systems and mixed-numerology systems.

In order to specify or otherwise determine the supported modulation levels for different modulation domains and their corresponding modulation switching intervals, in some embodiments one or more MCS tables may be used in conjunction with corresponding modulation switching intervals.

For example, an MCS table and a list of one or more possible switching intervals for each modulation domain may be separately specified in a standard specification, otherwise predetermined, or configured to a UE or other communication device or equipment by higher-layer signaling. The list of possible switching intervals may be applicable to all modulation levels in the MCS table of a modulation domain.

According to another embodiment, an MCS table for each modulation domain is specified in a standard specification, otherwise predetermined, or configured by higher-layer signaling. Each row of the MCS table for a modulation domain in this example may itself include the modulation level, code rate, and switching interval.

A further option involves a single MCS table, specified in a standard specification, otherwise predetermined, or configured by higher-layer signaling. Each row of the single MCS table may include modulation levels, code rates, and switching intervals of modulation domains of the overlaid modulation.

These three example MCS table options provide different trade-offs between flexibility, which among these examples is highest for the MCS table/list option and lowest for the single MCS table option, and higher-layer signaling overhead, which among these examples is lowest for the single MCS table option and highest for the MCS table/list option.

Regarding signaling, in one embodiment signaling associated with overlaid modulation is or includes control signaling for scheduling a transmission that uses overlaid modulation. Such control signaling may include a scheduling command, for example.

There are various options on construction of control signaling for scheduling a transmission. One option involves one DCI to schedule data transmission using one modulation domain. Therefore, multiple DCIs are transmitted to schedule an overlaid data transmission. In the context of an MCS table/list embodiment described herein, one DCI bitfield may indicate a scheduled MCS and another DCI bitfield may indicate the switching interval. In the case of an MCS table with each row specifying a switching interval, a single DCI bitfield may indicate the scheduled MCS and the corresponding switching interval by pointing to a row in the MCS table.

DCI format options for one DCI-per-modulation domain signaling include: different DCI formats for different modulation domains; and the same DCI format for different modulation domains, with the scheduled modulation domain being indicated explicitly using a modulation domain indicator bitfield for example.

Another control signaling option involves a single DCI to schedule data transmission using overlaid modulation. For example, a single DCI may include, for each scheduled modulation domain, one DCI bitfield to indicate the corresponding scheduled MCS and another DCI bitfield to indicate the corresponding switching interval for an embodiment that involves an MCS table and list as described at least above. In conjunction with an MCS table for each modulation domain with each row of the MCS table including information such as modulation level, code rate, and switching interval, a single DCI may include, for each scheduled modulation domain, a single DCI bitfield to indicate the scheduled MCS and the corresponding switching interval, by pointing to a row in the corresponding MCS table for example. Another MCS table option outlined at least above involves a single MCS table for all the modulation domains of the overlaid modulation, in which case a single DCI bitfield may indicate scheduled MCSs and corresponding switching intervals of the modulation domains by pointing to a row in the MCS table.

Using one DCI per modulation domain may involve less blind decoding complexity, at a UE for example, compared to using a single DCI to schedule the overlaid modulation. The single-DCI option, however, may provide more scheduling flexibility compared to using one DCI per modulation domain.

Some embodiments may involve capability signaling, by a UE for example, to indicate one or more capabilities for overlaid modulation. Although it is expected that capability signaling may be more applicable to a UE, other types of communication devices including network devices may also or instead communicate capability signaling.

Capability features that may be indicated in capability signaling may include, for example, whether or not a communication device supports overlaid modulation. This may be a basic or minimum capability in some embodiments, and capability signaling may include only a negative indication of support for overlaid modulation, without any further capability information or indications. If a device does not support overlaid modulation, then further capability information for overlaid modulation need not be provided by that device.

Capability signaling may also or instead be indicative of modulation domains. Such signaling may include, for example, a list of modulation domains supported by the device, and/or a list of overlaid modulation combinations supported by the device.

Modulation levels may also or instead be indicated in capability signaling. Examples of modulation level parameters or information that may be signaled in capability signaling include the following, any one or more of which may be indicated in capability signaling: one or more modulation levels, such as a maximum modulation level, supported for each supported modulation domain; and one or more combinations of modulation levels, such as maximum modulation levels, supported for each supported overlaid combination.

Another example of a capability feature that may also or instead be indicated in capability signaling is modulation switching interval. Capability signaling may be indicative of any one or more of the following, for example: one or more switching intervals, such as a minimum switching interval, for each supported modulation domain; and one or more combinations of modulation intervals, such as minimum switching intervals, supported for each supported overlaid combination.

Capability signaling may also or instead be indicative of whether or not a device supports unaligned (or aligned) modulation switching.

Whether or not a device supports single DCI for scheduling overlaid transmission, multiple DCIs for scheduling overlaid transmission, or both, may also or instead be indicated in capability signaling.

Capability signaling may be useful, for example, in enabling support of overlaid modulation for devices with different capabilities.

Regarding multi-traffic transmission using overlaid modulation, different bits or traffic may be transmitted with different parameters or characteristics such as QoS, delay, or reliability targets or requirements, over different modulation domains. Multi-traffic transmission using overlaid modulation may involve aspects of mapping or distributing traffic, also generally referred to herein as data, data bits, or data streams, between modulation domains.

In general, blocks of data are mapped to modulation domains. For example, one block of data such as a Transport Block (TB) can be mapped to multiple modulation domains in some embodiments. This is an example of full overlap referenced at least above in conjunction with FIG. 6. In another embodiment, each block of data such as a TB is mapped to one modulation domain, and may be passed to a separate FEC encoder as shown by way of example in FIG. 7. This is an example of no overlap between data or bits modulated in each modulation domain. Partial overlap is also possible as noted at least above.

Different TBs, or more generally different blocks of data or bits, can belong to a single traffic stream or application, or to different traffic streams or applications.

Some embodiments relate to resource allocation aspects of overlaid scheduling. According to one option for time-frequency resource allocation for overlaid modulation, the same time-frequency resource allocation is used for all overlaid modulation domains.

In another embodiment, different time-frequency resource allocations can be used for different modulation domains of an overlaid modulation. Over a subset of time-frequency resources scheduled for the overlaid modulation but not scheduled for a particular modulation domain in the overlay, a pre-specified, configured, or signaled modulation element of the particular modulation domain may be transmitted. In this scenario, there is only partial overlay of resources between modulation domains, and the pre-specified, configured, or signaled modulation element of the particular modulation domain is transmitted in a non-overlay area. As an example, in an overlaid modulation of constellation-domain and antenna-domain, a total of K OFDM symbols can be allocated for data transmission over constellation-domain and M out of the K OFDM symbols can be allocated for data transmission over antenna-domain. In this example, both the constellation values and antenna elements are employed to transmit data during the M OFDM symbols, whereas during the remaining K-M OFDM symbols only constellation values are used to transmit data over a pre-specified set of antenna elements without any antenna-element switching.

Some embodiments may involve multi-traffic multi-DCI scheduling. For example, a UE may receive a first DCI #1 which schedules a first uplink or downlink data transmission #1. Before or during data transmission #1, the may UE receive a second DCI #2 which schedules a second data transmission #2. Data transmission #2 may then be overlaid on data transmission #1. This type of "on-the-fly" overlay may be subject to one or more criteria or conditions. In this scenario, data transmission #2 may be overlaid on data transmission #1 if data transmission #2 is delay sensitive, for example.

Different modulation domains may provide different performance in terms of such parameters or characteristics as one or more of: delay, spectral efficiency, etc. Multi-traffic transmission using overlaid modulation may provide flexibility in applying different modulation domains to different traffic blocks or streams based on traffic requirements or targets, for example.

Overlaid modulation is described generally above, and several illustrative examples will now be considered in more detail.

Examples of a modulation domains that may be involved in overlaid modulation include at least the following, among others:

Constellation domain: Modulation elements include one or more (single-dimensional or multi-dimensional) constellation values from a set of constellation values;

Antenna/parasitic element domain: Modulation elements include one or more antenna elements or parasitic elements from a set of antenna elements or parasitic elements;

Beam/precoder domain: Modulation elements include one or more beams or precoders from a set of beams/precoders;

Resource domain: Modulation elements include one or more time resources, frequency resources, or time-frequency resources from a set of time resources, frequency resources, or time-frequency resources;

Sequence domain: Modulation elements include one or more sequences from a set of sequences.

These are examples of modulation domains, and others are possible.

Any combination of two or more modulation domains is possible for overlaid modulation.

Figure 19:
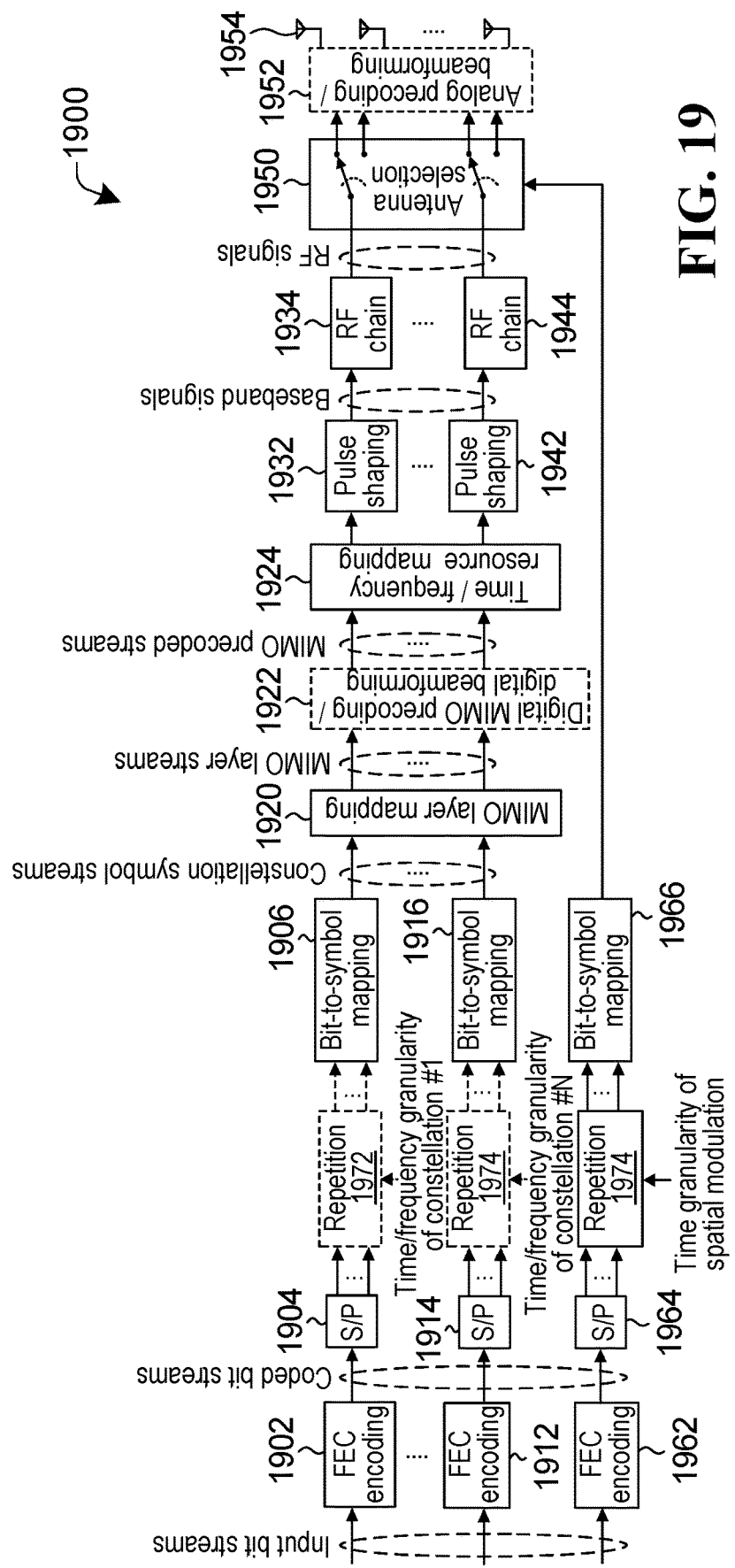
FIG. 19 is a block diagram illustrating an example of a transmitter implementing overlaid constellation-domain and spatial-domain modulation.

FIG. 19 is a block diagram illustrating an example of a transmitter implementing overlaid constellation-domain and spatial-domain modulation. The example transmitter 1900 in FIG. 19 includes various modules or elements. The modules 1902/1912, 1904/1914, 1906/1916 relate to constellation-domain modulation, and the modules 1962, 1964, 1966, and 1950 relate to spatial-domain modulation. The example transmitter 1900 also includes other modules 1920, 1922, 1924, 1932/1942, 1934/1944, and 1952, and antennal elements 1954.

Although the example transmitter 1900 in FIG. 19 may be substantially similar in structure to the example transmitter 500 in FIG. 5, the example transmitter 1900 includes repetition modules 1972, 1974, and 1976 to represent the concept of respective modulation switching intervals at which modulation elements associated with each modulation domain may be switched. As noted at least above with reference to FIG. 6, this concept need not necessarily involve modules that are separate from the modulation or mapping modules 1906, 1916, 1966. Other variations noted herein may also apply to the example transmitter 1900.

In the example transmitter 1900, constellation-domain modulation involves N constellations, and N may be 1 or more than 1. It is expected that the finest modulation switching interval, such as one RE (one subcarrier with one OFDM symbol), would be used for a modulation domain, but other embodiments may use a modulation switching interval other than a finest modulation switching interval for one or more modulation domains.

For spatial-domain modulation, in the case of a single RF chain, the same antenna selection is used over the entire transmission bandwidth and only time switching is done in the spatial domain. This is a potential hardware or implementation limitation that may apply in some embodiments. A time switching interval that is coarser than one OFDM symbol can be used in some embodiments, such as a half slot or one slot, to accommodate the switching capability of a transmitter.

In the case of multiple RF chains such as 1934, 1936 in the example transmitter 1900, both time and frequency switching are possible. For frequency switching, the different RF chains occupy different parts of transmission bandwidth.

Figure 20:
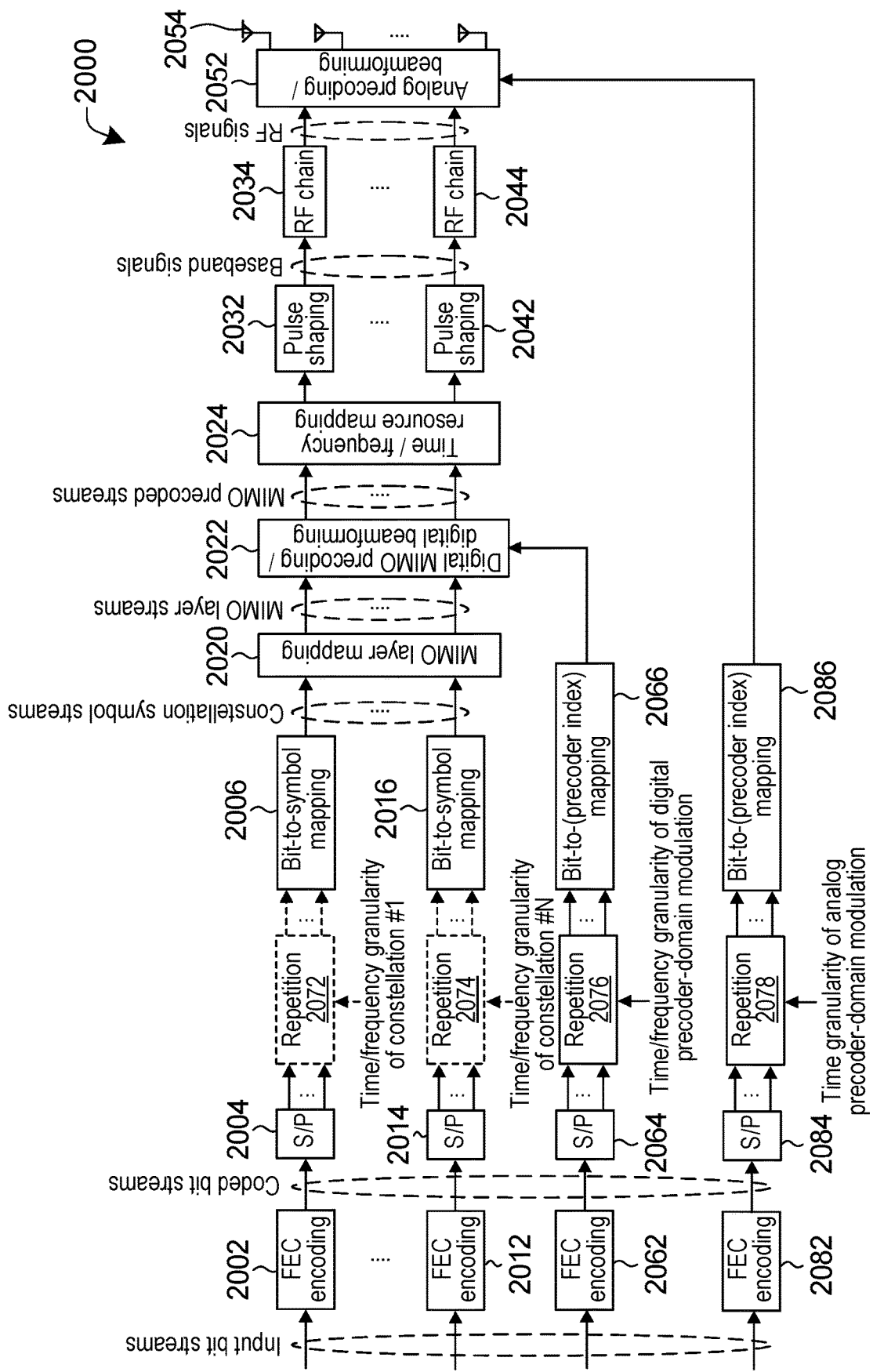
FIG. 20 is a block diagram illustrating an example of a transmitter implementing overlaid constellation-domain and precoder/beam-domain modulation.

FIG. 20 is a block diagram illustrating an example of a transmitter implementing overlaid constellation-domain and precoder/beam-domain modulation. The example transmitter 2000 in FIG. 20 includes various modules or elements. The modules 2002/2012, 2004/2014, and 2006/2016 relate to constellation-domain modulation, and the modules 2062/2082, 2064/2084, 2066/2086, 2022, and 2052 relate to precoder/beam-domain modulation. The modules 2020, 2024, 2032/2042, and 2034/2044, and antenna elements 2054, are also provided in the example shown.

Many of the modules in the example transmitter 2000 in FIG. 20 may be substantially similar to those in other example transmitters herein. The example transmitter 2000, however, includes repetition modules 2072, 2074, 2076, and 2078 to represent the concept of respective modulation switching intervals at which modulation elements associated with each modulation domain may be switched. The mapping modules 2066, 2086 are provided to map bit combinations to precoders, by precoder index in the example shown, and to control precoding by the modules 2022, 2052.

Variations noted elsewhere herein may apply to the example transmitter 2000.

Constellation-domain modulation in the example transmitter 2000 may be substantially the same as in the example transmitter 1900 in FIG. 19.

For precoder/beam-domain modulation, only digital precoding, only analog precoding, or hybrid precoding involving both digital precoding at 2022 and analog precoding at 2052 can be used. In the case of hybrid precoding, the same bit stream can be mapped to both digital and analog precoders, different bit streams can be mapped to the digital and analog precoders as in the example shown, or partially overlapping bit streams can be mapped to the digital and analog precoders. Time switching intervals coarser than one OFDM symbol, such as a half slot or one slot for example, can be used, alone or in combination with frequency switching in embodiments that include multiple RF chains as shown.

Figure 21:
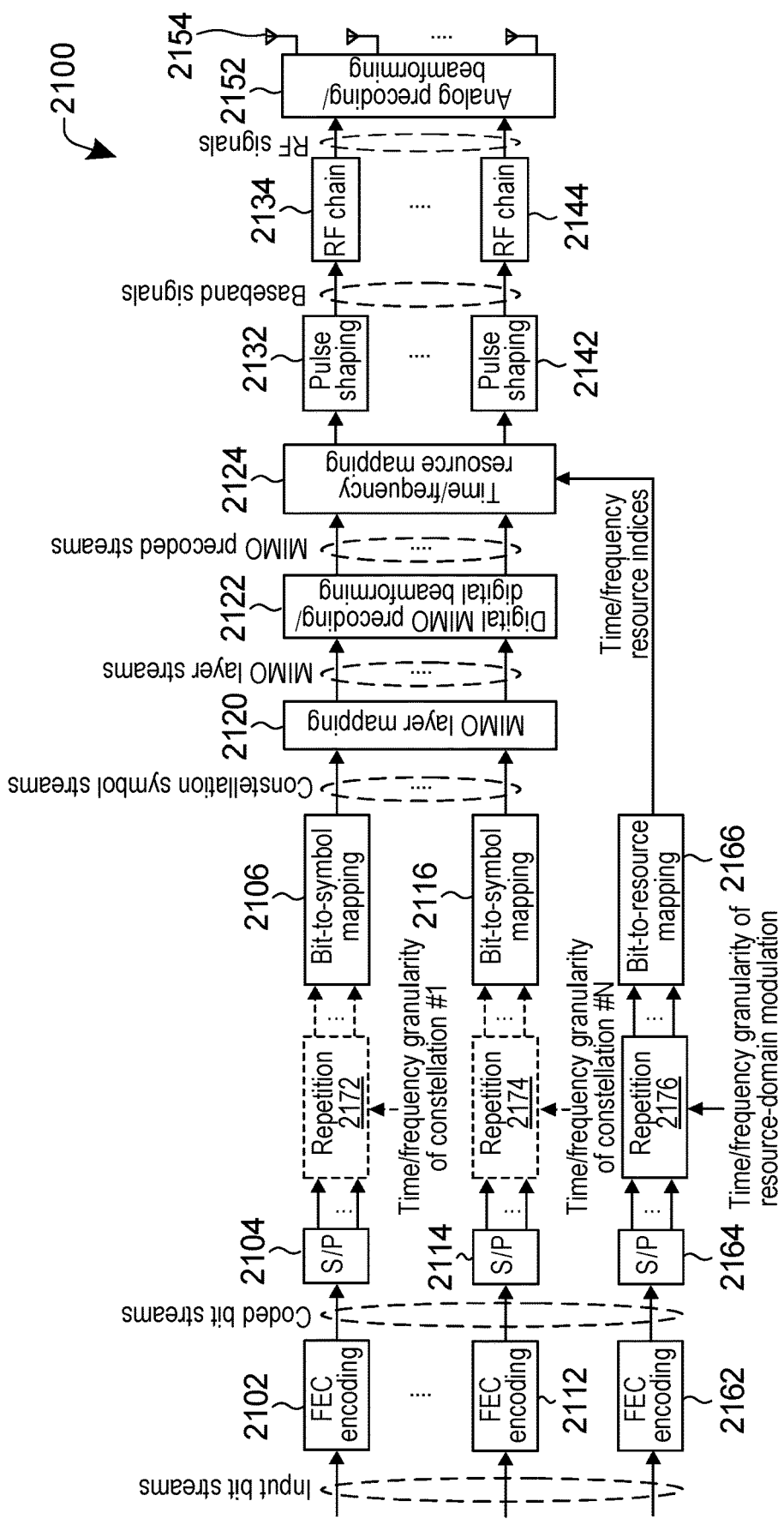
FIG. 21 is a block diagram illustrating an example of a transmitter implementing overlaid constellation-domain and resource-domain modulation.

FIG. 21 is a block diagram illustrating an example of a transmitter implementing overlaid constellation-domain and resource-domain modulation. The example transmitter 2100 in FIG. 21, like other embodiments, includes various modules or elements for which implementation options are provided elsewhere herein. The modules 2102/2112, 2104/2114, and 2106/2116 relate to constellation-domain modulation, and the modules 2162, 2164, 2166, and 2124 relate to resource-domain modulation. The modules 2120, 2122, 2132/2142, 2134/2144, and 2152 and antenna elements 2154 are also provided in the example shown.

Many of the modules in the example transmitter 2100 in FIG. 21 may be substantially similar to those in other example transmitters herein. The example transmitter 2100 includes repetition modules 2172, 2174, and 2176 to represent the concept of respective modulation switching intervals at which modulation elements associated with each modulation domain may be switched. The mapping module 2166 is provided to map bit combinations to resources, and to control resource mapping by the module 2124.

Variations noted elsewhere herein may apply to the example transmitter 2100.

Constellation-domain modulation in the example transmitter 2100 may be substantially the same as in the example transmitters 1900 and 2000 in FIGS. 19 and 20.

For resource-domain modulation, a set of resources is a resource modulation block, and a subset of the resources within the resource modulation block is selected for transmission based on the input bit combination, while transmitting zeros over other resources within the block. The selected subset of resources, or the combination of transmitted and null or zero transmission resources may be considered a modulation element. For time domain resource modulation, which may also be referred to or implemented as time index modulation, the resources are time resources such as OFDM symbols. For frequency domain resource modulation, which may also be referred to or implemented as frequency index modulation, the resources are frequency resources such as OFDM subcarriers. For time-frequency domain resource modulation, which may also be referred to or implemented as time-frequency index modulation, the resources are time-frequency resources such as REs.

Figure 22:
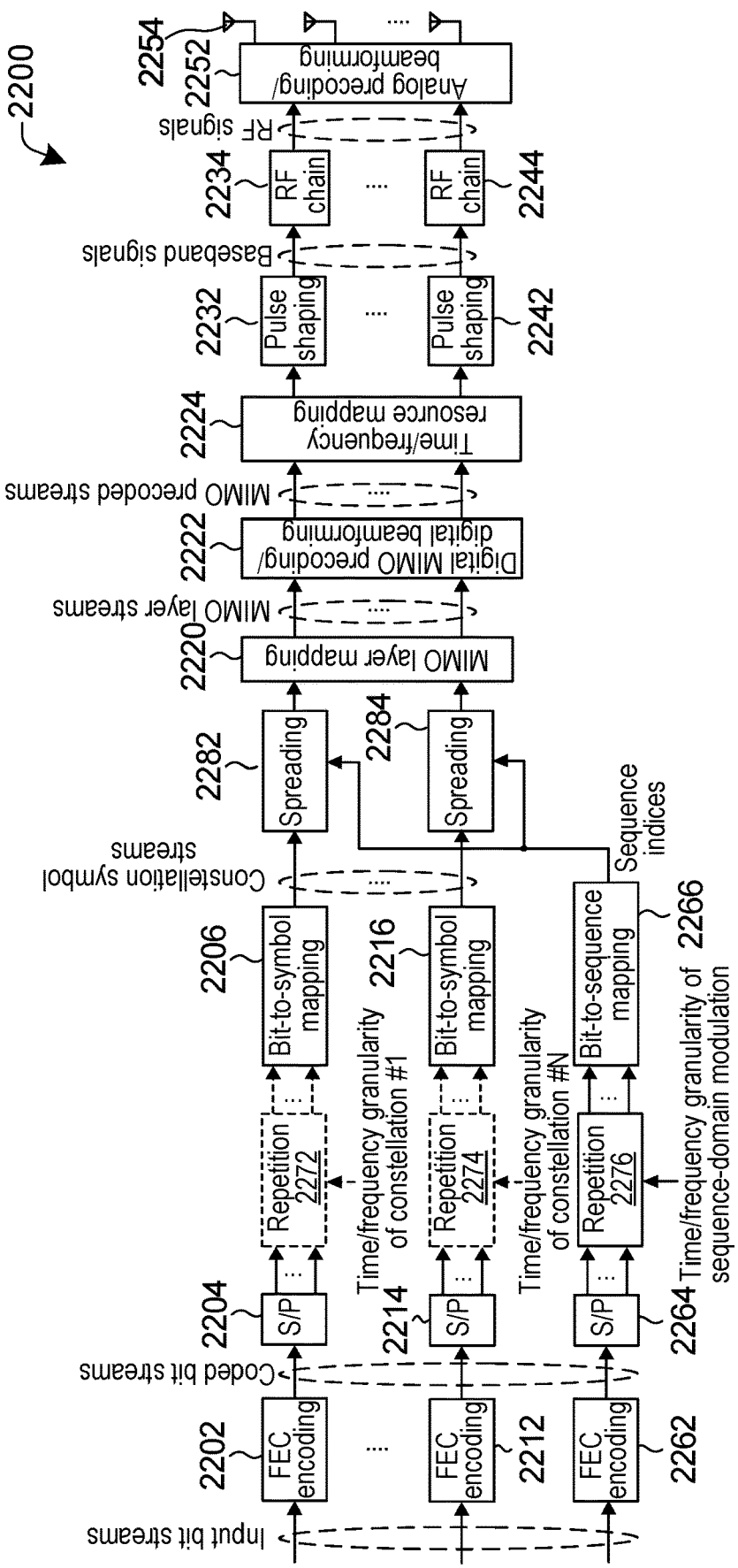
FIG. 22 is a block diagram illustrating an example of a transmitter implementing overlaid constellation-domain and sequence-domain modulation.

Another example transmitter is shown in FIG. 22. FIG. 22 is a block diagram illustrating an example of a transmitter implementing overlaid constellation-domain and sequence-domain modulation. The example transmitter 2200 in FIG. 22, like other embodiments, includes various modules or elements for which implementation options are provided elsewhere herein. The modules 2202/2212, 2204/2214, and 2206/2216 relate to constellation-domain modulation, and the modules 2262, 2264, 2266, 2282, and 2284 relate to resource-domain modulation. The modules 2220, 2222, 2224, 2232/2242, 2234/2244, and 2252 and antenna elements 2254 are also provided in the example shown.

Many of the modules in the example transmitter 2200 in FIG. 22 may be substantially similar to those in other example transmitters herein. The example transmitter 2200 includes repetition modules 2272, 2274, and 2276 to represent the concept of respective modulation switching intervals at which modulation elements associated with each modulation domain may be switched. The mapping module 2266 is provided to map bit combinations to sequences, and to provide sequence indices to control signal spreading by the spreading modules 2282, 2284 in the example shown.

Variations noted elsewhere herein may apply to the example transmitter 2200.

Constellation-domain modulation in the example transmitter 2200 may be substantially the same as in the example transmitters 1900, 2000, and 2100 in FIGS. 19 to 21.

For sequence-domain modulation, a set of sequences is used as a set of modulation sequences over a set of resources. Each input bit combination is mapped to one of the modulation sequences. That is, based on the input bit combination, one of the sequences is selected, and specified by index number in the example shown, for spreading the constellation symbols at 2282, 2284. In this example, each sequence is a modulation element.

FIGS. 19 to 22 illustrate example transmitters and example overlaid modulations. These are non-limiting examples, and other combinations of modulation domains may be used in other embodiments. For example, although the examples shown involve constellation domain modulation, overlaid modulation with modulation domains other than constellation domain are also possible.

Several illustrative and non-limiting examples of signaling are described below, with reference to FIGS. 23 to 26.

Figure 23:
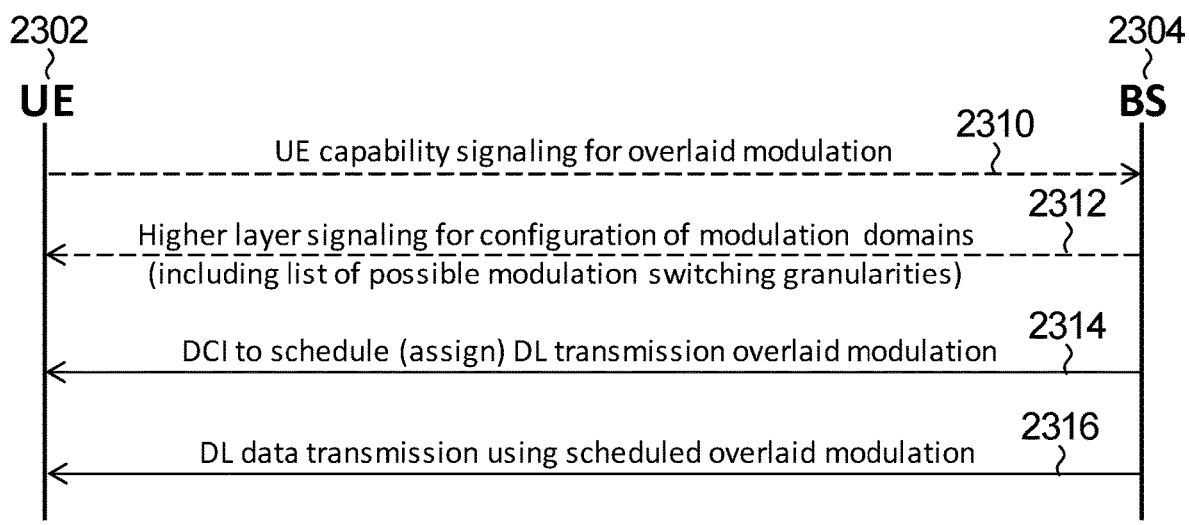
FIG. 23 is a signal flow diagram illustrating an example of signaling related to downlink overlaid transmission scheduled using a single DCI.

FIG. 23 is a signal flow diagram illustrating an example of signaling related to downlink overlaid transmission scheduled using a single DCI. At 2310, signaling indicative of UE capability for overlaid modulation may be transmitted by the UE 2302 and received by a network device, shown by way of example as a Base Station (BS) 2304. This signaling is optional and need not be communicated between a UE and a network device in all embodiments or every time overlaid modulation is to be used. Higher layer signaling transmitted by the BS 2304 and received by the UE 2302 at 2312, for configuration of modulation domains, is also shown in FIG. 23 by a dashed line to indicate that such signaling is also optional and need not necessarily be communicated in all embodiments or every time overlaid modulation is to be used. At 2314, a single DCI is transmitted by the BS 2304 and received by the UE 2302 to schedule downlink transmission using overlaid modulation. Scheduling via a single DCI as shown is one way in which overlaid modulation may be assigned or enabled for communicating data. The downlink data transmission from the BS 2304 to the UE 2302 using the scheduled overlaid modulation is shown at 2316.

Figure 24:
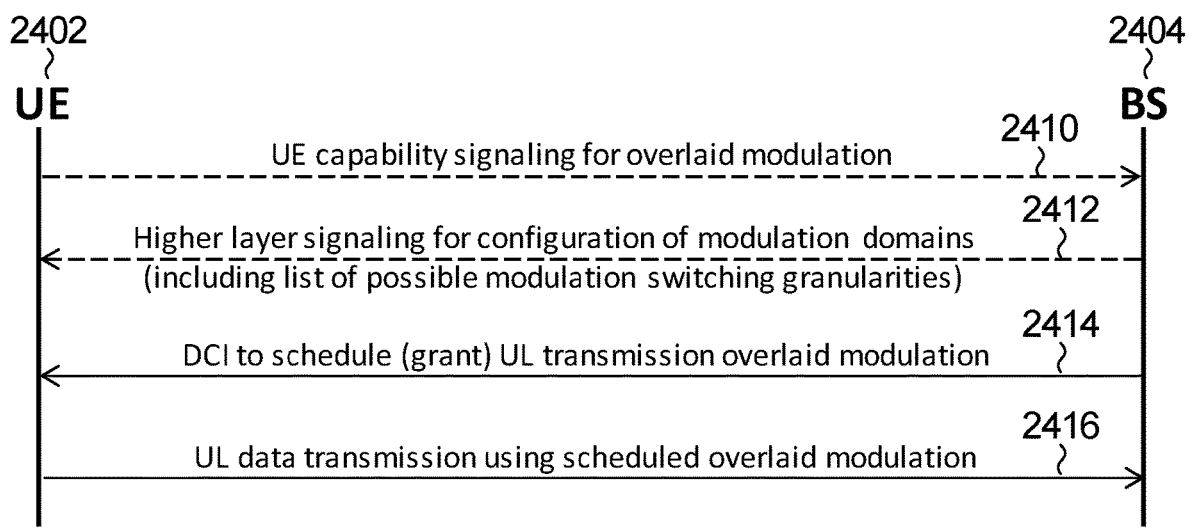
FIG. 24 is a signal flow diagram illustrating an example of signaling related to uplink overlaid transmission scheduled using a single DCI.

FIG. 24 is a signal flow diagram illustrating an example of signaling related to uplink overlaid transmission scheduled using a single DCI. The example in FIG. 24 is substantially similar to the example in FIG. 23, but is for uplink data transmission instead of downlink data transmission. Optional signaling indicative of UE capability for overlaid modulation is shown at 2410 as being transmitted by the UE 2402 and received by the BS 2404. Optional higher layer signaling transmitted by the BS 2404 and received by the UE 2402, for configuration of modulation domains, is shown at 2412. At 2414, a single DCI is transmitted by the BS 2404 and received by the UE 2402 to schedule uplink transmission using overlaid modulation, and as noted elsewhere herein scheduling via a single DCI as shown is one way in which overlaid modulation may be assigned or enabled for communicating data. The uplink data transmission from the BS 2404 to the UE 2402 using the scheduled overlaid modulation is shown at 2416.

Figure 25:
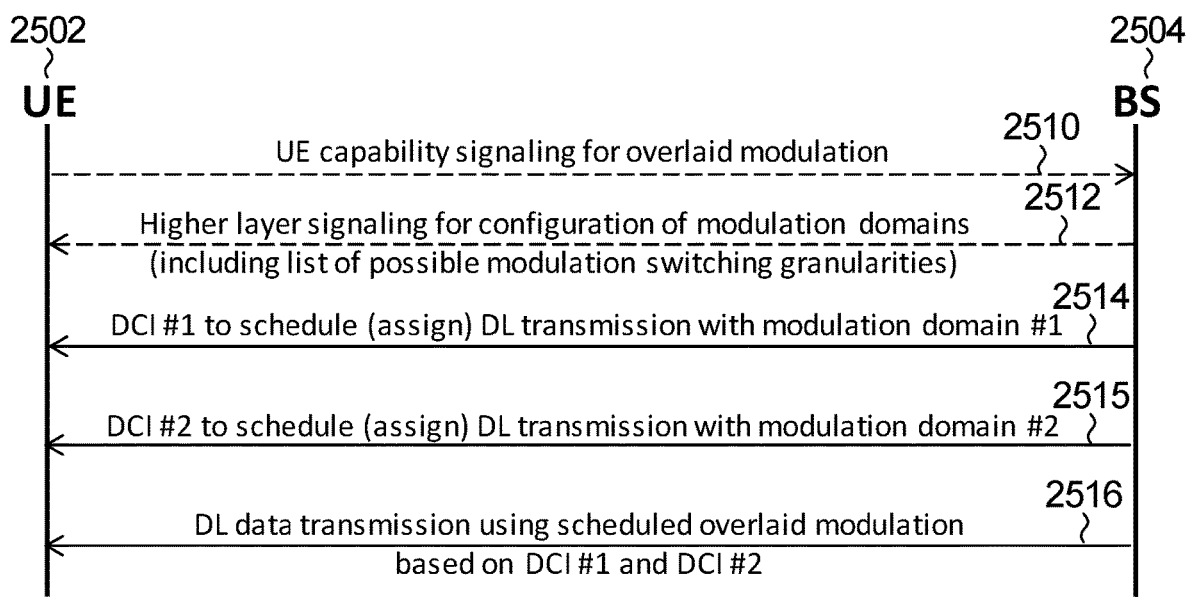
FIG. 25 is a signal flow diagram illustrating an example of signaling related to downlink overlaid transmission scheduled using multiple DCIs.

FIG. 25 is a signal flow diagram illustrating an example of signaling related to downlink overlaid transmission scheduled using multiple DCIs. The example in FIG. 25 is otherwise the same as the single-DCI example in FIG. 23. Optional signaling indicative of UE capability for overlaid modulation is shown at 2510 as being transmitted by the UE 2502 and received by the BS 2504. Optional higher layer signaling transmitted by the BS 2504 and received by the UE 2502, for configuration of modulation domains, is shown at 2512. At 2514, a first DCI #1 is transmitted by the BS 2504 and received by the UE 2502 to schedule downlink transmission using a first modulation domain #1, and at 2515, a second DCI #2 is transmitted by the BS 2504 and received by the UE 2502 to schedule downlink transmission using a second modulation domain #2. Scheduling via multiple DCIs as shown is another way in which overlaid modulation may be assigned or enabled for communicating data. The downlink data transmission from the BS 2504 to the UE 2502 using the scheduled overlaid modulation based on DCI #1 and DCI #2 is shown at 2516.

Figure 26:
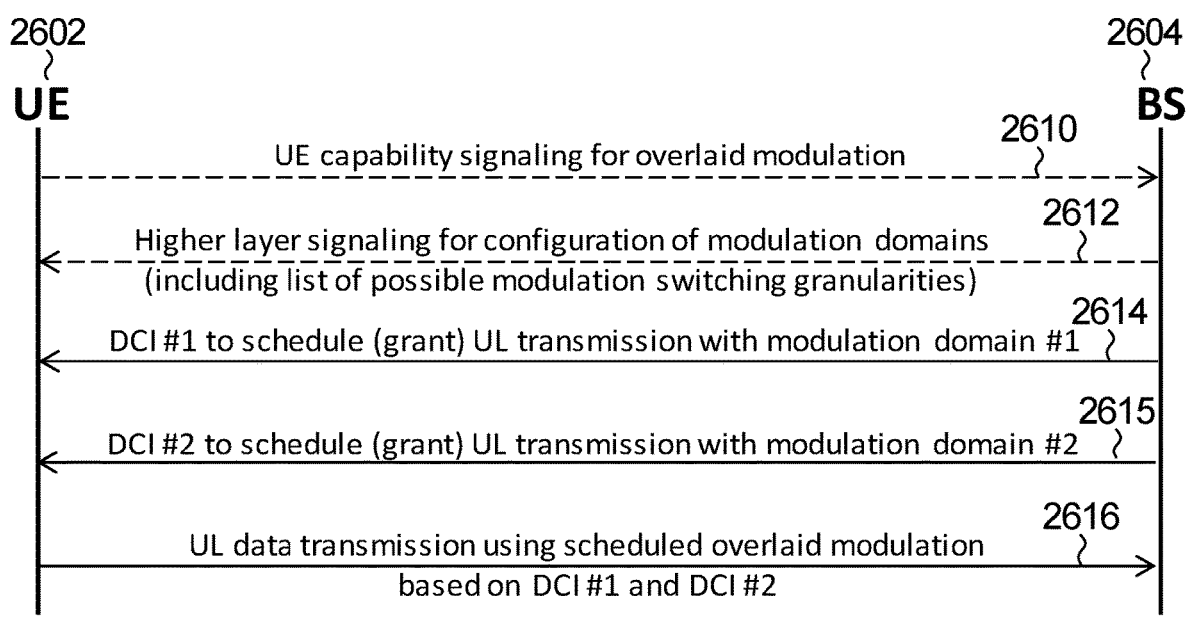
FIG. 26 is a signal flow diagram illustrating an example of signaling related to uplink overlaid transmission scheduled using multiple DCIs.

FIG. 26 is a signal flow diagram illustrating an example of signaling related to uplink overlaid transmission scheduled using multiple DCIs. The example in FIG. 26 is otherwise the same as the single-DCI example in FIG. 24. Optional signaling indicative of UE capability for overlaid modulation is shown at 2610 as being transmitted by the UE 2602 and received by the BS 2604. Optional higher layer signaling transmitted by the BS 2604 and received by the UE 2602, for configuration of modulation domains, is shown at 2612. At 2614, a first DCI #1 is transmitted by the BS 2604 and received by the UE 2602 to schedule uplink transmission using a first modulation domain #1, and at 2615, a second DCI #2 is transmitted by the BS 2604 and received by the UE 2602 to schedule downlink transmission using a second modulation domain #2. As noted elsewhere herein, scheduling via multiple DCIs as shown is another way in which overlaid modulation may be assigned or enabled for communicating data. The uplink data transmission from the BS 2604 to the UE 2602 using the scheduled overlaid modulation based on DCI #1 and DCI #2 is shown at 2616.

FIGS. 23 to 26 are illustrative of various embodiments. These embodiments are illustrative of example methods that involve communicating, in a wireless communication network, signaling that is indicative of multiple modulation domains for overlaid modulation and is indicative of multiple modulation switching intervals, and communicating data, modulated using the overlaid modulation, in the wireless communication network. The multiple modulation switching intervals include a respective modulation switching interval for each of the multiple modulation domains, and each respective modulation switching interval is different from other modulation switching intervals in the multiple modulation switching intervals.

Signaling is shown by way of example in FIGS. 23 to 26 at 2314, 2414, 2514/2515, 2614/2615, and in some embodiments signaling may be or include higher layer signaling as shown by way of example at 2312, 2412, 2512, 2612. FIGS. 23 to 26 also illustrate communicating data at 2316, 2416, 2516, 2616. These signaling and data communication examples are for downlink and uplink data communications, but other types of communications including sidelink communications for example, are also possible.

Methods consistent with the present disclosure may include any of various other features. For example, in some embodiments, communicating data involves communicating a data transmission at a time-frequency location, and the multiple modulation switching intervals include a modulation switching interval that is independent of the time-frequency location of the data transmission. An example of this is shown in FIG. 11. The multiple modulation switching intervals may also or instead include a modulation switching interval that is defined with respect to the time-frequency location of the data transmission, as shown by way of example in FIGS. 12 to 14.

The multiple modulation switching intervals may be or include aligned modulation switching intervals that are aligned with each other. In some embodiments, the multiple modulation switching intervals also or instead include unaligned modulation switching intervals that are unaligned with each other. Examples of aligned modulation switching intervals are shown in FIGS. 15-16, and examples of unaligned modulation switching intervals are shown in FIGS. 17-18.

Modulation switching intervals may include one or more switching units, which as noted elsewhere herein may be: the same for modulation switching intervals that include one or more switching units; specific to each modulation domain for each of the modulation switching intervals that include one or more switching units; or specific to a numerology, such as a numerology associated with communicating the data.

The signaling indicative of the multiple modulation domains and the multiple modulation switching intervals may be indicative of information in one or more MCS tables, and examples are provided elsewhere herein.

Single-DCI signaling examples are provided in FIGS. 23 and 24, and multiple-DCI signaling examples are provided in FIGS. 25 and 26. In some embodiments, the signaling indicative of the multiple modulation domains and indicative of the multiple modulation switching intervals is or includes respective DCI associated with each of the multiple modulation domains. In other embodiments, the signaling indicative of the multiple modulation domains and indicative of the multiple modulation switching intervals is or includes a DCI that includes DCI bitfields associated with each of the multiple modulation domains. Other signaling embodiments are also possible.

As noted with reference to FIGS. 23 to 26, UE capability signaling at 2310, 2410, 2510, 2610 is optional. Such signaling is used in some embodiments, and therefore in general a method may involve communicating capability signaling indicative of one or more capabilities for the overlaid modulation. The one or more capabilities may include any one or more of the following, for example: whether or not a communication device supports overlaid modulation; modulation domains supported by a communication device; overlaid modulation combinations supported by a communication device; one or more modulation levels supported for each modulation domain that is supported by a communication device; one or more combinations of modulation levels supported for each overlaid combination that is supported by a communication device; one or more switching intervals for each modulation domain that is supported by a communication device; one or more combinations of modulation intervals supported for each overlaid combination that is supported by a communication device; whether or not a communication device supports unaligned or aligned modulation switching; and a type of scheduling supported by a communication device. The communication device for which capability information is communicated may be a UE as shown by way of example in FIGS. 23 to 26. It should be appreciated, however, that other communication devices such as network devices may also or instead communicate capability signaling indicative of one or more of their capabilities for overlaid modulation.

Overlaid modulation may involve modulation of respective blocks of data according to the multiple modulation domains. The respective blocks of data may include data blocks that include common bits modulated according to more than one of the multiple modulation domains. In other embodiments, the overlaid modulation involves modulation of each of a plurality non-overlapping blocks of data according to a respective one of the multiple modulation domains.

Regarding resource allocation, the overlaid modulation may use a common communication resource allocation for the multiple modulation domains or a respective communication resource allocation for each of the multiple modulation domains.

The multiple modulation domains involved in an overlaid modulation may include, for example, any two or more of: constellation domain, antenna element domain, parasitic element domain, antenna beam domain, precoder domain, and communication resource domain.

It should be noted that "communicating" herein may include transmitting, receiving, or both. Consider FIG. 23 as an example. From the perspective of the UE 2302, communicating signaling may include receiving a DCI at 2314, possibly receiving higher layer signaling at 2312, possibly also or instead transmitting UE capability signaling at 2310. From the perspective of the BS 2304, communicating signaling may include transmitting a DCI at 2314, possibly transmitting higher layer signaling at 2312, and possibly also or instead receiving UE capability signaling at 2310. Similarly, communicating data at 2316 in the example in FIG. 23 may involve receiving data, by the UE 2302, and/or transmitting data, by the BS 2304.

Other variations are also possible. Consider FIG. 25 as an example. Communicating DCI #1 at 2514 is an example of communicating first signaling indicative of a first modulation domain and indicative of a first modulation switching interval for the first modulation domain. Although not shown in FIG. 25, the BS 2504 and the UE 2502 may communicate data modulated using the first modulation domain. Communicating DCI #2 at 2515 is an example of communicating second signaling indicative of a second modulation domain and indicative of a second modulation switching interval for the second modulation domain. Subsequent to communicating the second signaling, data modulated using the first modulation domain and the second modulation domain for the overlaid modulation may be communicated.

In some embodiments, the second signaling is received after data modulated using the first modulation domain has been communicated, and in this sense communications may change from single-domain modulation to multiple-domain modulation "on-the-fly".

A start of communicating data using overlaid modulation or a change to overlaid modulation, or more generally communicating data modulated using the first modulation domain and the second modulation domain for the overlaid modulation, may be subject to one or more criteria or conditions, such as a determination that receiving communication device and/or transmitting communication device capabilities are sufficient for overlaid modulation, or receipt of a command, instruction, or indication to use overlaid modulation. In other embodiments, overlaid modulation is used responsive to communicating signaling indicative of the multiple modulation domains for overlaid modulation and the multiple modulation switching intervals.

Figure 27A:
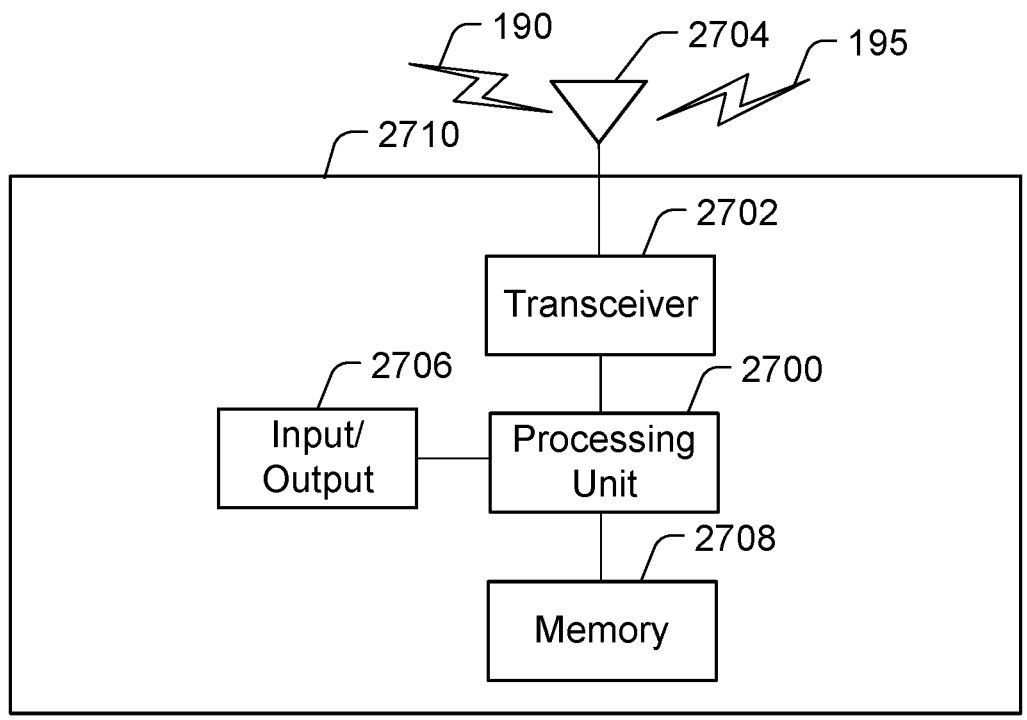
FIGS. 27A and 27B are block diagrams illustrating example devices that may implement the methods and teachings according to this disclosure.
Figure 27B:
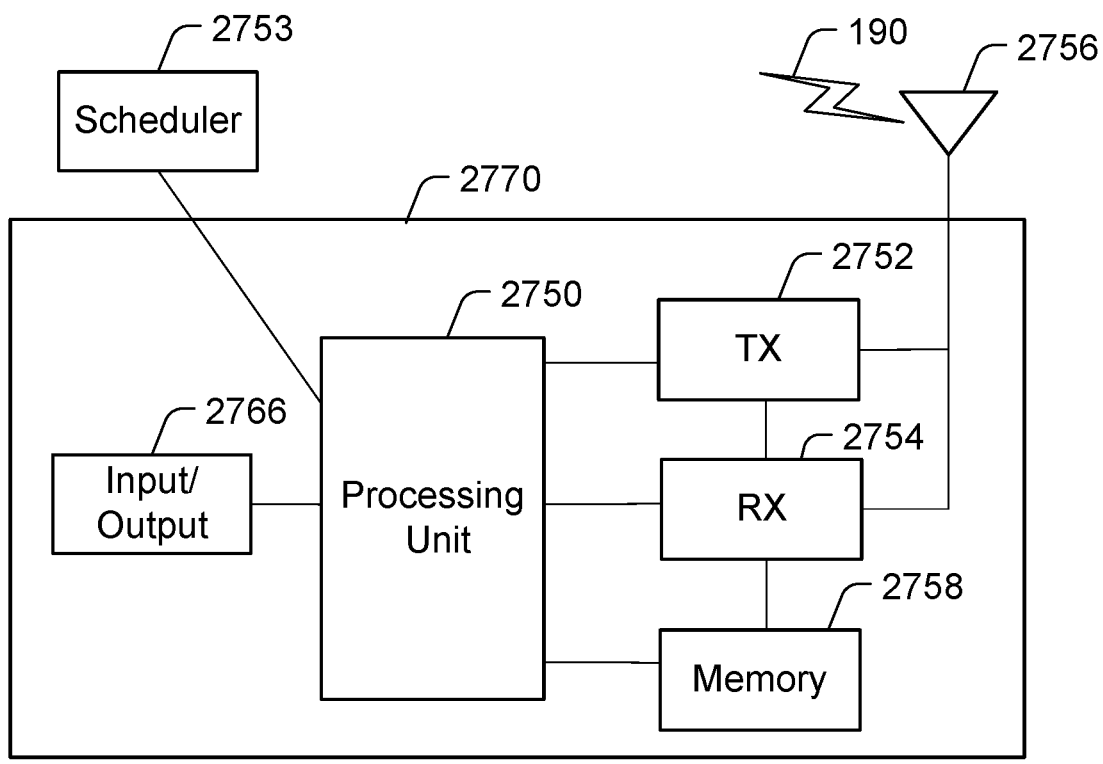

Other embodiments, such as apparatus embodiments, are also possible. FIGS. 6, 7, and 19 to 22 illustrate apparatus embodiments in the context of modules or elements. FIGS. 27A and 27B illustrate, in another form, example devices that may implement features according to this disclosure.

FIG. 27A illustrates an example ED 2710, and FIG. 27B illustrates an example base station 2770. These components could be used in the system 100 (FIG. 1) or in any other suitable system.

As shown in FIG. 27A, the ED 2710 includes at least one processing unit 2700. The processing unit 2700 implements various processing operations of the ED 2710. For example, the processing unit 2700 could perform signal coding, data processing, power control, input processing, output processing, or any other functionality enabling the ED 2710 to operate in a communication system. The processing unit 2700 may also be configured to implement some or all of the functionality or embodiments described in more detail herein. Each processing unit 2700 includes any suitable processing or computing device configured to perform one or more operations. Each processing unit 2700 could, for example, include a microprocessor, microcontroller, digital signal processor, field programmable gate array, or application specific integrated circuit.

The ED 2710 also includes at least one transceiver 2702. The transceiver 2702 is configured to modulate data or other content for transmission by at least one antenna or NIC (Network Interface Controller) 2704. The transceiver 2702 is also configured to demodulate data or other content received by the at least one antenna 2704. Each transceiver 2702 includes any suitable structure for generating signals for wireless transmission and/or processing signals received wirelessly or by wire. Each antenna 2704 includes any suitable structure for transmitting and/or receiving wireless signals. One or multiple transceivers 2702 could be used in the ED 2710, and one or multiple antennas 2704 could be used in the ED 2710. Although shown as a single functional unit, a transceiver 2702 could be implemented using at least one transmitter and at least one separate receiver.

The ED 2710 further includes one or more input/output devices 2706 or interfaces. The input/output devices 2706 facilitate interaction with a user or other devices (network communications) in the network. Each input/output device 2706 includes any suitable structure for providing information to or receiving/providing information from a user, such as a speaker, microphone, keypad, keyboard, display, or touch screen, including network interface communications.

In addition, the ED 2710 includes at least one memory 2708. The memory 2708 stores instructions and data used, generated, or collected by the ED 2710. For example, the memory 2708 could store software instructions or modules configured to implement some or all of the functionality or embodiments described above and that are executed by the processing unit(s) 2700. Each memory 2708 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 27B, the base station 2770 includes at least one processing unit 2750, at least one transmitter 2752, at least one receiver 2754, one or more antennas 2756, at least one memory 2758, and one or more input/output devices or interfaces 2766. A transceiver, not shown, may be used instead of the transmitter 2752 and receiver 2754. A scheduler 2753 may be coupled to the processing unit 2750. The scheduler 2753 may be included within or operated separately from the base station 2770. The processing unit 2750 implements various processing operations of the base station 2770, such as signal coding, data processing, power control, input processing, output processing, or any other functionality. The processing unit 2750 can also be configured to implement some or all of the functionality or embodiments described in more detail herein. Each processing unit 2750 includes any suitable processing or computing device configured to perform one or more operations. Each processing unit 2750 could, for example, include a microprocessor, microcontroller, digital signal processor, field programmable gate array, or application specific integrated circuit.

Each transmitter 2752 includes any suitable structure for generating signals for wireless transmission to one or more EDs or other devices. Each receiver 2754 includes any suitable structure for processing signals received wirelessly or by wire from one or more EDs or other devices. Although shown as separate components, at least one transmitter 2752 and at least one receiver 2754 could be combined into a transceiver. Each antenna 2756 includes any suitable structure for transmitting, receiving, or both transmitting and receiving wireless signals. While a common antenna 2756 is shown here as being coupled to both the transmitter 2752 and the receiver 2754, one or more antennas 2756 could be coupled to the transmitter(s) 2752, and one or more separate antennas 2756 could be coupled to the receiver(s) 2754. Each memory 2758 includes any suitable volatile and/or non-volatile storage and retrieval device(s) such as those described above in connection to the ED 2710. The memory 2758 stores instructions and data used, generated, or collected by the base station 2770. For example, the memory 2758 could store software instructions or modules configured to implement some or all of the functionality or embodiments described herein and that are executed by the processing unit(s) 2750.

Each input/output device 2766 facilitates interaction with a user or other devices (network communications) in the network. Each input/output device 2766 includes any suitable structure for providing information to or receiving/providing information from a user, including network interface communications.

It should be appreciated that one or more embodiments disclosed herein, including method embodiments or apparatus embodiments, may be implemented by corresponding units or modules. For example, a signal may be transmitted by a transmitting unit or a transmitting module. A signal may be received by a receiving unit or a receiving module. A signal may be processed by a processing unit or a processing module. Other features may be performed by these or other modules. The respective units or modules may be implemented using hardware, components that execute software, or a combination thereof. For instance, one or more of the units or modules may be or include one or more integrated circuits, such as field programmable gate arrays (FPGAs) or application-specific integrated circuits (ASICs). It will be appreciated that where the modules are implemented using software, they may be retrieved by a processor, in whole or part as needed, individually or together for processing, in single or multiple instances, and that the modules themselves may include instructions for further deployment and instantiation.

In general, hardware, firmware, components which execute software, or some combination thereof could be used in implementing features disclosed herein. Electronic devices that might be suitable for implementing any or all of these components include, among others, microprocessors, microcontrollers, Programmable Logic Devices (PLDs), Field Programmable Gate Arrays (FPGAs), Application Specific Integrated Circuits (ASICs), and other types of "intelligent" integrated circuits.

Any of various types of memory devices could be implemented. Either or both of the memory 2708 and the memory 2758, for example, could include one or more physical memory devices. Solid-state memory devices such as a Flash memory device could be implemented. Memory devices with movable or even removable storage media could also or instead be implemented.

FIG. 27A and FIG. 27B illustrate examples of a UE and a network device, respectively, in which embodiments could be implemented. More generally, an apparatus may include a processor and a non-transitory computer readable storage medium, such as the processing unit 2700, 2750 and memory 2708, 2758 in FIG. 27A or FIG. 27B. Such an apparatus may be a UE. Another example of an apparatus is network equipment, which may be a gNB, a TRP, a base station, or any other type of network device or equipment referenced herein. Other components, such as a communication interface to which the processor is coupled, may also be provided. Elements 2702, 2704, 2752, 2754, 2756 in FIGS. 27A and 27B are examples of communication interfaces that may be provided in some embodiments.

In an embodiment, the storage medium stores programming for execution by the processor, and the programming includes instructions to perform a method as disclosed herein. For example, the instructions, when executed by a processor, may cause the processor to perform any of various operations.

Another embodiment relates to a computer program product that includes a non-transitory computer readable storage medium storing programming. The programming includes instructions to perform a method as disclosed herein.

In some embodiments, the programming includes instructions to, or to cause a processor to, communicate, in a wireless communication network, signaling indicative of multiple modulation domains for overlaid modulation and indicative of multiple modulation switching intervals; and communicate data, modulated using the overlaid modulation, in the wireless communication network. The multiple modulation switching intervals include a respective modulation switching interval for each of the multiple modulation domains, and each respective modulation switching interval is different from other modulation switching intervals in the multiple modulation switching intervals.

Some embodiments include any one or more of the following features, in any of various combinations:

the instructions include instructions to, or to cause a processor to, communicate data by communicating a data transmission at a time-frequency location;

the multiple modulation switching intervals include a modulation switching interval that is independent of the time-frequency location of the data transmission;

the multiple modulation switching intervals include a modulation switching interval that is defined with respect to the time-frequency location of the data transmission;

the multiple modulation switching intervals include aligned modulation switching intervals that are aligned with each other;

the multiple modulation switching intervals include unaligned modulation switching intervals that are unaligned with each other;

the multiple modulation switching intervals include modulation switching intervals that include one or more switching units;

the switching units are the same for the modulation switching intervals that include one or more switching units;

the switching units are specific to each modulation domain for each of the modulation switching intervals that include one or more switching units;

the switching units are specific to a numerology, such as a numerology associated with communicating the data;

the signaling indicative of the multiple modulation domains and indicative of the multiple modulation switching intervals is indicative of information in one or more MCS tables;

the signaling indicative of the multiple modulation domains and indicative of the multiple modulation switching intervals includes respective DCIs associated with each of the multiple modulation domains;

the signaling indicative of the multiple modulation domains and indicative of the multiple modulation switching intervals includes a DCI that includes DCI bitfields associated with each of the multiple modulation domains;

the instructions further include instructions to, or to cause a processor to, communicate capability signaling indicative of one or more capabilities for the overlaid modulation;

the one or more capabilities include any one or more of: whether or not a communication device supports overlaid modulation; modulation domains supported by a communication device; overlaid modulation combinations supported by a communication device; one or more modulation levels supported for each modulation domain that is supported by a communication device; one or more combinations of modulation levels supported for each overlaid combination that is supported by a communication device; one or more switching intervals for each modulation domain that is supported by a communication device; one or more combinations of modulation intervals supported for each overlaid combination that is supported by a communication device; whether or not a communication device supports unaligned or aligned modulation switching; and a type of scheduling supported by a communication device—the communication device may be the apparatus itself or another communication device;

the overlaid modulation involves modulation of respective blocks of data according to the multiple modulation domains, and the respective blocks of data include data blocks that include common bits modulated according to more than one of the multiple modulation domains;

the overlaid modulation involves modulation of each of a plurality non-overlapping blocks of data according to a respective one of the multiple modulation domains;

the overlaid modulation involves a common communication resource allocation for the multiple modulation domains;

the overlaid modulation involves a respective communication resource allocation for each of the multiple modulation domains;

the multiple modulation domain include any two or more of: constellation domain, antenna element domain, parasitic element domain, antenna beam domain, precoder domain, and communication resource domain;

the instructions include instructions to, or to cause a processor to, communicate signaling by communicating first signaling indicative of a first modulation domain and indicative of a first modulation switching interval for the first modulation domain;

the instructions include instructions to, or to cause a processor to, communicate data by communicating data modulated using the first modulation domain;

the instructions further include instructions to, or to cause a processor to, communicate second signaling indicative of a second modulation domain and indicative of a second modulation switching interval for the second modulation domain;

the instructions further include instructions to, or to cause a processor to, communicate data by communicating data modulated using the first modulation domain and the second modulation domain for the overlaid modulation;

communicating data modulated using the first modulation domain and the second modulation domain for the overlaid modulation is subject to one or more criteria or conditions, examples of which are provided elsewhere herein.

Other features that could be implemented in apparatus embodiments or in non-transitory computer readable storage medium embodiments could be or become apparent, for example, from the method embodiments disclosed herein. Features disclosed in the context of any embodiment are not necessarily exclusive to that particular embodiment, and may also or instead be applied to other embodiments.

What has been described is merely illustrative of the application of principles of embodiments of the present disclosure. Other arrangements and methods can be implemented by those skilled in the art.

For example, although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment could be combined with selected features of other example embodiments.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

Although aspects of the present invention have been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although embodiments and potential advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

In addition, although described primarily in the context of methods and apparatus, other implementations are also contemplated, as instructions stored on a non-transitory computer-readable medium, for example. Such media could store programming or instructions to perform any of various methods consistent with the present disclosure.

Moreover, any module, component, or device exemplified herein that executes instructions may include or otherwise have access to a non-transitory computer readable or processor readable storage medium or media for storage of information, such as computer readable or processor readable instructions, data structures, program modules, and/or other data. A non-exhaustive list of examples of non-transitory computer readable or processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and nonremovable media implemented in any method or technology, random-access memory (RAM), read-only memory (ROM), electrically erasable programmable read-only memory (EEPROM), flash memory or other memory technology. Any such non-transitory computer readable or processor readable storage media may be part of a device or accessible or connectable thereto. Any application or module herein described may be implemented using instructions that are readable and executable by a computer or processor may be stored or otherwise held by such non-transitory computer readable or processor readable storage media.

What is claimed is:

1. A method comprising:

communicating, in a wireless communication network, signaling that is indicative of multiple modulation domains for overlaid modulation of data and is indicative of multiple modulation switching intervals, the multiple modulation domains being different from each other, the multiple modulation switching intervals comprising a respective modulation switching interval at which modulation elements associated with each of the multiple modulation domains may be switched, each respective modulation switching interval being different from other modulation switching intervals in the multiple modulation switching intervals;

communicating data, that is modulated using the overlaid modulation, in the wireless communication network, the communicating comprising communicating data that is modulated using a first modulation domain of the multiple modulation domains and a second modulation domain of the multiple modulation domains, wherein communicating signaling comprises communicating first signaling that is indicative of the first modulation domain and is indicative of a first modulation switching interval at which modulation elements associated with the first modulation domain may be switched;

the method further comprises communicating data that is modulated using the first modulation domain;

communicating signaling further comprises communicating second signaling that is indicative of the second modulation domain and is indicative of a second modulation switching interval at which modulation elements associated with the second modulation domain may be switched;

communicating data that is modulated using the overlaid modulation comprises, subsequent to communicating the second signaling, communicating data that is modulated using the first modulation domain and the second modulation domain.

2. The method of claim 1, wherein communicating data comprises communicating a data transmission at a time-frequency location, wherein the multiple modulation switching intervals comprise a modulation switching interval that is independent of the time-frequency location of the data transmission.

3. The method of claim 1, wherein communicating data comprises communicating a data transmission at a time-frequency location, wherein the multiple modulation switching intervals comprise a modulation switching interval that is defined with respect to the time- frequency location of the data transmission.

4. The method of claim 1, wherein the multiple modulation switching intervals comprise aligned modulation switching intervals that are aligned with each other.

5. The method of claim 1, wherein the multiple modulation switching intervals comprise unaligned modulation switching intervals that are unaligned with each other.

6. The method of claim 1,
wherein the multiple modulation switching intervals comprise modulation switching intervals that include one or more switching units,
wherein the switching units are: the same for the modulation switching intervals that include one or more switching units; specific to each modulation domain for each of the modulation switching intervals that include one or more switching units; or specific to a numerology associated with communicating the data.

7. The method of claim 1, wherein the overlaid modulation comprises modulation of respective blocks of data according to the multiple modulation domains, wherein the respective blocks of data comprise data blocks that include common bits modulated according to more than one of the multiple modulation domains.

8. The method of claim 1, wherein the overlaid modulation comprises modulation of each of a plurality non-overlapping blocks of data according to a respective one of the multiple modulation domains.

9. An apparatus comprising:
a communication interface;
a processor, coupled to the communication interface;
a non-transitory computer readable storage medium, coupled to the processor, storing programming for execution by the processor, the programming including instructions to:
communicate, in a wireless communication network, signaling that is indicative of multiple modulation domains for overlaid modulation of data and is indicative of multiple modulation switching intervals, the multiple modulation domains being different from each other, the multiple modulation switching intervals comprising a respective modulation switching interval at which modulation elements associated with each of the multiple modulation domains may be switched, each respective modulation switching interval being different from other modulation switching intervals in the multiple modulation switching intervals;
communicate data, that is modulated using the overlaid modulation, in the wireless communication network, by communicating data that is modulated using a first modulation domain of the multiple modulation domains and a second modulation domain of the multiple modulation domains, wherein the instructions comprise instructions to communicate signaling by communicating first signaling that is indicative of the first modulation domain and is indicative of a first modulation switching interval at which modulation elements associated with the first modulation domain may be switched;

the instructions further comprise instructions to communicate data that is modulated using the first modulation domain;

the instructions further comprise instructions to communicate signaling by communicating second signaling that is indicative of the second modulation domain and is indicative of a second modulation switching interval at which modulation elements associated with the second modulation domain may be switched;

the instructions comprise instructions to communicate data that is modulated using the overlaid modulation by communicating, subsequent to communicating the second signaling, data that is modulated using the first modulation domain and the second modulation domain.

10. The apparatus of claim 9, wherein the instructions comprise instructions to communicate data by communicating a data transmission at a time-frequency location, wherein the multiple modulation switching intervals comprise a modulation switching interval that is independent of the time-frequency location of the data transmission.

11. The apparatus of claim 9, wherein the instructions comprise instructions to communicate data by communicating a data transmission at a time-frequency location, wherein the multiple modulation switching intervals comprise a modulation switching interval that is defined with respect to the time-frequency location of the data transmission.

12. The apparatus of claim 9, wherein the multiple modulation switching intervals comprise aligned modulation switching intervals that are aligned with each other.

13. The apparatus of claim 9, wherein the multiple modulation switching intervals comprise unaligned modulation switching intervals that are unaligned with each other.

14. The apparatus of claim 9,
wherein the multiple modulation switching intervals comprise modulation switching intervals that include one or more switching units,
wherein the switching units are: the same for the modulation switching intervals that include one or more switching units; specific to each modulation domain for each of the modulation switching intervals that include one or more switching units; or specific to a numerology associated with communicating the data.

15. The apparatus of claim 9, wherein the overlaid modulation comprises modulation of respective blocks of data according to the multiple modulation domains, wherein the respective blocks of data comprise data blocks that include common bits modulated according to more than one of the multiple modulation domains.

16. The apparatus of claim 9, wherein the overlaid modulation comprises modulation of each of a plurality non-overlapping blocks of data according to a respective one of the multiple modulation domains.

17. A computer program product comprising a non-transitory computer readable storage medium storing programming, the programming including instructions to:
communicate, in a wireless communication network, signaling that is indicative of multiple modulation domains for overlaid modulation of data and is indicative of multiple modulation switching intervals, the multiple modulation domains being different from each other, the multiple modulation switching intervals comprising a respective modulation switching interval at which modulation elements associated with each of the multiple modulation domains may be switched, each respective modulation switching interval being different from other modulation switching intervals in the multiple modulation switching intervals;
communicate data, that is modulated using the overlaid modulation, in the wireless communication network, by communicating data that is modulated using a first modulation domain of the multiple modulation domains and a second modulation domain of the multiple modulation domains,
wherein
the instructions comprise instructions to communicate signaling by communicating first signaling that is indicative of the first modulation domain and is indicative of a first modulation switching interval at which modulation elements associated with the first modulation domain may be switched;
the instructions further comprise instructions to communicate data that is modulated using the first modulation domain;
the instructions further comprise instructions to communicate signaling by communicating second signaling that is indicative of the second modulation domain and is indicative of a second modulation switching interval at which modulation elements associated with the second modulation domain may be switched;
the instructions comprise instructions to communicate data that is modulated using the overlaid modulation by communicating, subsequent to communicating the second signaling. data that is modulated using the first modulation domain and the second modulation domain.

* * * * *